United States Patent
Zou et al.

(10) Patent No.: US 12,549,396 B2
(45) Date of Patent: Feb. 10, 2026

(54) POWER MANAGEMENT METHOD AND APPARATUS FOR POWER SOURCING EQUIPMENT

(71) Applicant: Huawei Technologies Co., Ltd., Shenzhen (CN)

(72) Inventors: Mujie Zou, Dongguan (CN); Chenhui Deng, Dongguan (CN); Shenghua Niu, Nanjing (CN); Chao Gu, Nanjing (CN); Weibiao Chen, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 82 days.

(21) Appl. No.: 18/400,303

(22) Filed: Dec. 29, 2023

(65) Prior Publication Data

US 2024/0187266 A1    Jun. 6, 2024

Related U.S. Application Data

(63) Continuation of application No. PCT/CN2022/095322, filed on May 26, 2022.

(30) Foreign Application Priority Data

Jun. 30, 2021 (CN) .......................... 202110745345.X

(51) Int. Cl.
    *H04L 12/10*    (2006.01)
(52) U.S. Cl.
    CPC .................................. *H04L 12/10* (2013.01)
(58) Field of Classification Search
    None
    See application file for complete search history.

(56) References Cited

U.S. PATENT DOCUMENTS

| 9,831,913 B2 * | 11/2017 | Tarn .......................... H04B 3/54 |
| 2006/0177192 A1 * | 8/2006 | Jonnala ..................... G06F 1/28 385/147 |
| 2008/0114997 A1 * | 5/2008 | Chin ....................... H04L 12/10 713/321 |
| 2017/0214533 A1 | 7/2017 | Chen et al. |
| 2018/0150127 A1 | 5/2018 | Wendt et al. |

\* cited by examiner

*Primary Examiner* — Fahmida Rahman
(74) *Attorney, Agent, or Firm* — Conley Rose, P.C.

(57) ABSTRACT

A power management method includes power sourcing equipment (PSE) supplying power to a plurality of powered devices (PDs), and determining reserved power of the PSE based on a power usage status, where the reserved power is used to continue supplying power to the plurality of PDs when actual available power of the PSE is exhausted, and where the reserved power varies with the power usage status of the PSE.

20 Claims, 7 Drawing Sheets

POWER MANAGEMENT METHOD AND APPARATUS FOR POWER SOURCING EQUIPMENT

CROSS-REFERENCE TO RELATED APPLICATIONS

This is a continuation of International Patent Application No. PCT/CN2022/095322 filed on May 26, 2022, which claims priority to Chinese Patent Application No. 202110745345.X filed on Jun. 30, 2021. The disclosures of the aforementioned applications are hereby incorporated by reference in their entireties.

TECHNICAL FIELD

This disclosure relates to the field of power control technologies, and in particular, to a power management method and apparatus for power sourcing equipment (PSE).

BACKGROUND

A power over Ethernet (POE) technology is a technology used to transmit both a signal and power through a twisted pair. A POE system includes PSE and a powered device (PD). The PSE can transmit, through a port, a data signal and supply power to a connected PD. When total power consumed by PDs increases and exceeds entire available power of the PSE, the PSE powers off a PD with a low-priority port. When the total power consumed by the PDs decreases to allow the low-priority port to be powered on, the PSE can power on the low-priority port. Therefore, when the total power consumed by the PDs is close to the entire available power of the PSE, a problem of repeated power-on and power-off of the low-priority port easily occurs.

To prevent the low-priority port from being repeatedly powered on and off, fixed reserved power is usually set. However, this reduces entire available power of the PSE, and some low-priority ports cannot be powered on all the time. Consequently, power utilization is low.

SUMMARY

This disclosure provides a power management method and apparatus for PSE, so that PSE supplies power to more PDs to a greater extent, thereby improving power utilization.

According to a first aspect, this disclosure provides a power management method for PSE. The method may be performed by PSE, or may be performed by a component (such as a chip or a chip system) deployed in the PSE. This is not limited in this disclosure. The following description is merely an example, and the method provided in the first aspect is described by using the PSE as an execution body.

For example, the method includes: the PSE supplies power to a plurality of PDs; and the PSE determines reserved power of the PSE based on a power usage status, where the reserved power is used to continue supplying power to the plurality of PDs when actual available power of the PSE is exhausted, and the reserved power varies with the power usage status of the PSE.

According to the foregoing technical solutions, the PSE determines the reserved power based on the power usage status, so that the reserved power can be flexibly adjusted, and as many PDs as possible can be powered on, thereby improving power utilization. In addition, because the reserved power of the PSE is set, a PD that has been powered on is not easily powered off again, and therefore, a problem of repeated power-on and power-off of a PD corresponding to a low-priority port can be alleviated.

Optionally, the power usage status includes a power usage status of a first port in the plurality of ports provided by the PSE, and the first port is a port with a lowest priority in a plurality of used ports of the PSE. That the PSE determines reserved power of the PSE based on a power usage status includes: the PSE determines the reserved power of the PSE based on applied power or used power of a first PD connected to the first port.

The reserved power of the PSE is determined based on the power usage status of the first port with the lowest priority in the plurality of ports, for example, the applied power or the used power of the first PD on the first port. This provides an implementation of setting the reserved power based on the power usage status. In this way, the reserved power may be flexibly adjusted based on the power usage status of the first port, thereby improving power utilization.

Further, that the PSE determines the reserved power of the PSE based on applied power or used power of a first PD connected to the first port includes: the PSE determines the applied power of the first PD connected to the first port or n times the applied power of the first PD as the reserved power of the PSE, where n is a constant greater than 1; or determines m times the actually used power of the first PD as the reserved power of the PSE, where m is a constant greater than 1.

The applied power of the first PD, or n times the applied power of the first PD, or m times the actually used power of the first PD may be used as the reserved power of the PSE. In this way, a plurality of possible implementation methods for the reserved power are provided, so that the reserved power in this disclosure can be flexibly set.

Optionally, the power usage status includes a power change frequency of the PSE, and the power change frequency of the PSE indicates a change frequency of total power actually used by the PSE. That the PSE determines reserved power of the PSE based on a power usage status includes: the PSE determines a first power value as the reserved power when the power change rate is greater than or equal to a preset first threshold; or the PSE determines a second power value as the reserved power when the power change rate is less than the first threshold. The first power value is greater than the second power value.

The reserved power of the PSE is determined by using the power change frequency of the PSE. This provides another implementation of setting the reserved power based on a power usage status, so that the reserved power can change with the power change frequency, thereby improving power utilization.

With reference to the first aspect, in some possible implementations of the first aspect, the method further includes: the PSE determines the actual available power, where the actual available power is a difference of entire available power of the PSE minus the reserved power; and the PSE continues supplying power to the first PD when the actual available power is not exhausted; or the PSE powers off the first PD when accumulated duration in which the actual available power is exhausted but the reserved power is not exhausted reaches a preset threshold; or the PSE powers off the first PD when the reserved power is exhausted.

When the PSE determines that the accumulated duration in which the actual available power is exhausted but the reserved power is not exhausted reaches the preset threshold, or when the reserved power is exhausted, the PSE powers off the first PD, which provides specific cases in which the first PD is powered off. In addition, when the actual available power is exhausted but the reserved power is not exhausted, the accumulated duration in the phase is recorded and compared with the preset threshold, so that the first PD is not powered off immediately, but is powered off only when the accumulated duration reaches the preset threshold. A frequency of powering off the first PD is reduced.

With reference to the first aspect, in some possible implementations of the first aspect, the method further includes: the PSE determines a power overload capacity, where the power overload capacity is a difference of total power actually used by the PSE minus the actual available power of the PSE; and when the power overload capacity is greater than or equal to zero and less than the reserved power, the PSE determines that the actual available power is exhausted but the reserved power is not exhausted; or when the power overload capacity is greater than or equal to the reserved power, the PSE determines that the reserved power is exhausted.

This disclosure introduces the power overload capacity, and provides an implementation of determining usage statuses of the actual available power and the reserved power. The usage statuses of the actual available power and the reserved power are determined based on a value of the power overload capacity.

With reference to the first aspect, in some possible implementations of the first aspect, the preset threshold includes a first preset threshold and a second preset threshold, and the first preset threshold is greater than the second preset threshold. That the PSE powers off the first PD when accumulated duration in which the actual available power is exhausted but the reserved power is not exhausted reaches a preset threshold includes: the PSE powers off the first PD when accumulated duration in which the power overload capacity is greater than or equal to zero and less than the actually used power of the first PD reaches the first preset threshold; or the PSE powers off the first PD when accumulated duration in which the power overload capacity is greater than or equal to the actually used power of the first PD and less than the reserved power reaches the second preset threshold.

Further, that the actual available power of the PSE is exhausted but the reserved power is not exhausted may be divided into two cases. In one case, the power overload capacity is greater than or equal to zero (that is, the actual available power of the PSE is exhausted) but is less than the actually used power of the first PD, that is, a part of the power used by the first PD comes from the actual available power of the PSE, and the other part comes from the reserved power. In the other case, the power overload capacity is greater than or equal to the actually used power of the first PD but less than the reserved power. In other words, in addition to the first PD, there may be another PD that also uses the reserved power. For the foregoing two cases, the first preset threshold and the second preset threshold of different values may be set respectively, to determine whether to power off the first PD. Therefore, the interval is further divided, so that when the power usage status of the first PD jumps in different intervals for a short time, the first PD is not immediately powered off.

With reference to the first aspect, in some possible implementations of the first aspect, the method further includes: the PSE powers on the first PD again when remaining power is greater than the applied power of the first PD, where the remaining power is a difference of the actual available power minus total power actually used by the PSE after the first PD is powered off.

After the first PD is powered off, the PSE may power on the first PD again when the remaining power is greater than the applied power of the first PD. In this method, the first PD is not powered on again in a short time, thereby alleviating a problem of repeated power-on and power-off of a low-priority port.

With reference to the first aspect, in some possible implementations of the first aspect, the method further includes: the PSE determines maximum allowable overload power of a PD connected to each of the plurality of powered-on ports; and the PSE powers off a second PD connected to a second port when accumulated duration in which power used by the second PD is greater than applied power of the second PD but is less than or equal to the maximum allowable overload power of the second PD reaches a third preset threshold; or powers off the second PD when the power used by the second PD is greater than the maximum allowable overload power, where the second port is any port of the plurality of powered-on ports.

The PSE determines, based on a power usage status of a PD connected to each port, whether to power off the PD, thereby reducing a phenomenon of repeated power-on and power-off of each port, and further preventing used power of the PD from being excessively high, so as to protect the PD.

According to a second aspect, this disclosure provides a power management method for PSE. The method may be performed by PSE, or may be performed by a component (such as a chip or a chip system) deployed in the PSE. This is not limited in this disclosure. The following description is merely an example, and the method provided in the second aspect is described by using the PSE as an execution body.

For example, the method includes: the PSE determines a power overload capacity, where the power overload capacity is a difference of total power actually used when the PSE supplies power to a plurality of PDs minus actual available power of the PSE, the total power is a sum of actual power used by a plurality of powered-on ports, and the actual available power of the PSE is a difference of entire available power of the PSE minus reserved power; the PSE determines, based on the power overload capacity and a plurality of intervals, whether to continue supplying power to the plurality of PDs; and if the power overload capacity falls into a first interval, continues supplying power to the plurality of PDs; or powers off, if the power overload capacity falls into a second interval, one or more PDs of the plurality of PDs when accumulated duration in which the power overload capacity falls into the second interval reaches a preset threshold.

According to the foregoing technical solutions, the PSE determines the power overload capacity, predefines the first interval and the second interval, dynamically monitors an interval in which the power overload capacity is located and accumulated duration in which the power overload capacity is located in the interval, and determines whether to power off one or more PDs. Different intervals are divided, and accumulated duration in which the power overload capacity is located in an interval is monitored in real time, so that one or more PDs are not easily powered off. Therefore, a problem of repeated power-on and power-off of a low-priority port can be alleviated.

With reference to the second aspect, in some possible implementations of the second aspect, the first interval is $(-\infty, 0)$, the second interval is $[0, P_s)$, and $P_s$ is the reserved power.

A range of the first interval is $(-\infty, 0)$, which is a case in which the actual available power of the PSE is not exhausted, and the second interval is $[0, P_s)$, which is a case in which the reserved power is not exhausted. The first interval and the second interval are embodied. Then, an interval in which the power overload capacity is located is determined.

With reference to the second aspect, in some possible implementations of the second aspect, the second interval includes a trigger zone and a dangerous zone, the trigger zone is [0, $P_r$), and the dangerous zone is [$P_r$, $P_s$). $P_r$ is actually used power of a first PD connected to a first port of the PSE, and the first port is a port with a lowest priority in a plurality of used ports of the PSE.

The second interval is further divided into the trigger zone and the dangerous zone. The trigger zone is [0, $P_r$), that is, the power overload capacity is greater than or equal to zero but less than the actually used power of the first PD. The dangerous zone is [$P_r$, $P_s$), that is, the power overload capacity is greater than or equal to the actually used power of the first PD but less than the reserved power. By dividing the interval, power is better managed, and a problem of repeated power-on and power-off of the first PD is alleviated.

With reference to the second aspect, in some possible implementations of the second aspect, the preset threshold includes a first preset threshold and a second preset threshold, and the first preset threshold is greater than the second preset threshold. The powering off, if the power overload capacity falls into a second interval, one or more PDs of the plurality of PDs when accumulated duration in which the power overload capacity falls into the second interval reaches a preset threshold includes: powering off the first PD connected to the first port when accumulated duration in which the power overload capacity falls into the trigger zone reaches the first preset threshold; or powering off the first PD connected to the first port when accumulated duration in which the power overload capacity falls into the dangerous zone reaches the second preset threshold, where the first port is the port with the lowest priority in the plurality of used ports of the PSE.

In the two cases, remaining reserved power is different. Compared with the dangerous zone, the trigger zone has more remaining reserved power, and therefore can provide more power to cope with power overload, and reliability is higher. Therefore, for the foregoing two cases, different accumulated duration thresholds may be set respectively, to determine whether to power off the first PD. For example, the first preset threshold is greater than the second preset threshold. Therefore, the first PD is powered off only when accumulated duration in which the power overload capacity is in a specific zone reaches a preset threshold, and the first PD is less likely to be powered off.

With reference to the second aspect, in some possible implementations of the second aspect, that the PSE determines, based on the power overload capacity and a plurality of intervals, whether to continue supplying power to the plurality of PDs includes: determining a count value C, where the count value C is a sum of a most recently updated count value and a count factor corresponding to an interval into which the power overload capacity falls, and a count factor corresponding to the first interval is less than a count factor corresponding to the second interval; determining, based on the count value C and a predefined maximum power-off count $C_{max}$, whether to continue supplying power to the plurality of PDs; and if $C \leq C_{max}$, continuing supplying power to the plurality of PDs; or if $C > C_{max}$, powering off one or more PDs in the plurality of PDs.

Different count factors are set for different intervals, it may be further determined, based on a value relationship between the count value and the predefined maximum power-off count, whether to continue supplying power to the plurality of PDs. For example, when the count value is less than or equal to the maximum power-off count, the PSE continues supplying power to the plurality of PDs. When the count value is greater than the maximum power-off count, one or more PDs are powered off. A specific implementation algorithm is given. The count value is a sum of accumulated count factors. Therefore, one or more PDs are not easily powered off, so that power is better managed, and a problem of repeated power-on and power-off of a low-priority port is alleviated.

With reference to the second aspect, in some possible implementations of the second aspect, the first interval includes a stable zone and a critical zone, the stable zone is (−∞, −|$P_s$−$P_r$|), and the critical zone is [−|$P_s$−$P_r$|, 0) and corresponds to a first count factor c, where c is a negative number. $P_s$ is the reserved power, $P_r$ is the actually used power of the first PD connected to the first port of the PSE, and the first port is the port with the lowest priority in the plurality of used ports of the PSE. The determining a count value includes: if the power overload capacity falls into the stable zone, setting the count value to zero; or if the power overload capacity falls into the critical zone, determining that the count value is a sum of the most recently updated count value and the first count factor c.

A range of the first interval is (−∞, 0), which is a case in which the actual available power of the PSE is not exhausted. The first interval is further divided into two subintervals, which are respectively denoted as the stable zone and the critical zone, and different zones correspond to different methods for determining the count value. An interval in which the power overload capacity is located is observed, and the count value is determined based on the interval in which the power overload capacity is located, so as to determine whether the first PD is in danger of being powered off.

With reference to the second aspect, in some possible implementations of the second aspect, the trigger zone is corresponding to a second count factor b, the dangerous zone is corresponding to a third count factor a, a>b, and a and b are positive numbers. The determining a count value includes: if the power overload capacity falls into the trigger zone, determining that the count value is a sum of the most recently updated count value and the second count factor b; or if the power overload capacity falls into the dangerous zone, determining that the count value is a sum of the most recently updated count value and the third count factor a.

The trigger zone and the dangerous zone correspond to different count factors. It should be understood that the dangerous zone is relatively more dangerous, and the corresponding count factor is larger. The count value is determined based on an interval in which the power overload capacity is located, so as to facilitate determining whether a PD has a risk of being powered off.

With reference to the second aspect, in some possible implementations of the second aspect, if the power overload capacity falls into a third interval, the PSE powers off one or more of the plurality of PDs. The third interval is [$P_s$, +∞), and $P_s$ is the reserved power.

With reference to the second aspect, in some possible implementations of the second aspect, the method further includes: the PSE powers on the first PD again when remaining power is greater than the applied power of the first PD, where the remaining power is a difference of the actual available power minus total power used by ports of the PSE after the first PD is powered off. The first PD is a PD connected to the first port, and the first port is the port with the lowest priority in the plurality of used ports of the PSE.

After the first PD is powered off, the PSE powers on the first PD again when total power actually used by all the remaining powered-on PDs is reduced by a large enough amount to meet a case in which the remaining power is greater than the applied power of the first PD. In this method, the first PD is not powered on again in a short period of time, thereby alleviating a problem of repeated power-on and power-off of a low-priority port.

With reference to the second aspect, in some possible implementations of the second aspect, the method further includes: the PSE determines maximum allowable overload power of a PD connected to each of the plurality of powered-on ports; and the PSE powers off a second PD connected to a second port when accumulated duration in which power used by the second PD is greater than applied power of the second PD but is less than or equal to the maximum allowable overload power of the second PD reaches a third preset threshold; or powers off the second PD when the used power of the second PD is greater than the maximum allowable overload power. The second port is any one of the plurality of powered-on ports.

The PSE determines, based on a power usage status of a PD connected to each port, whether to power off the PD, so that a problem of repeated power-on and power-off of any port in all powered-on ports is alleviated, and used power of the PD is prevented from being excessively high, thereby protecting the PD.

According to a third aspect, this disclosure provides a power management apparatus for PSE, including units configured to implement the method according to any one of the first aspect, the second aspect, and the possible implementations of the first aspect and the second aspect. It should be understood that each unit may implement a corresponding function by executing a computer program.

According to a fourth aspect, this disclosure provides a power management apparatus for PSE, including a processor, where the processor is configured to perform the power management method for PSE according to any one of the first aspect, the second aspect, and the possible implementations of the first aspect and the second aspect.

The apparatus may further include a memory, configured to store instructions and data. The memory is coupled to the processor, and when executing the instructions stored in the memory, the processor may implement the methods described in the foregoing aspects. The apparatus may further include a communication interface. The communication interface is used by the apparatus to communicate with another device. For example, the communication interface may be a transceiver, a circuit, a bus, a module, or another type of communication interface.

According to a fifth aspect, this disclosure provides a chip system. The chip system includes at least one processor, configured to support implementation of functions according to any one of the first aspect, the second aspect, and the possible implementations of the first aspect and the second aspect, for example, receiving or processing data and/or information in the foregoing method.

In a possible design, the chip system further includes a memory, the memory is configured to store program instructions and data, and the memory is located inside or outside the processor.

The chip system may include a chip, or may include a chip and another discrete component.

According to a sixth aspect, this disclosure provides a computer-readable storage medium, including a computer program. When the computer program runs on a computer, the computer is enabled to implement the method according to any one of the first aspect, the second aspect, and the possible implementations of the first aspect and the second aspect.

According to a seventh aspect, this disclosure provides a computer program product, and the computer program product includes a computer program (which may also be referred to as code or an instruction). When the computer program is run, a computer is enabled to perform the method according to any one of the first aspect, the second aspect, and the possible implementations of the first aspect and the second aspect.

It should be understood that the third aspect to the seventh aspect of this disclosure correspond to the technical solutions in the first aspect and the second aspect of this disclosure, and beneficial effects achieved by the aspects and corresponding feasible implementations are similar. Details are not described again.

DESCRIPTION OF EMBODIMENTS

The following describes technical solutions of this disclosure with reference to the accompanying drawings.

Before embodiments of this disclosure are described, terms in this disclosure are first briefly described.

1. PSE: is a device that supplies power to a PD by using a POE technology, and is a manager of an entire POE system in a power supply process. The PSE may include but is not limited to, for example, a network switching device such as a POE converter and a hub.

The method provided in embodiments of this disclosure may be applied to a multi-port power supply system. One PSE may be provided with a plurality of ports, and the PSE may supply power to connected PDs through the plurality of ports. In embodiments of this disclosure, the plurality of ports may correspond to different priorities.

2. PD: is a device connected to the PSE, and may include but is not limited to, for example, an access point (AP), a telephone set, a network camera, a palmtop computer, a mobile phone charger, and the like.

The PD may be connected to the PSE through a port, to receive a data signal and a power supply signal from the PSE. As described above, the plurality of ports of the PSE may correspond to different priorities. Therefore, PDs connected to ports with different priorities may also correspond to different priorities. A port of each priority and a PD connected to the port may be fixed.

Figure 1:
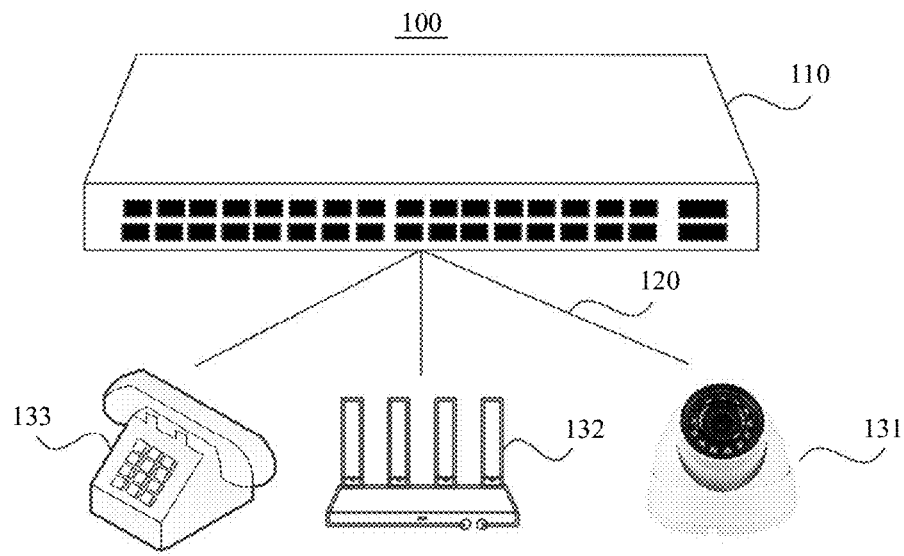
FIG. 1 is a schematic diagram of a POE system applicable to a method according to embodiments of this disclosure.

FIG. 1 is a schematic diagram of a POE system applicable to the method according to embodiments of this disclosure.

As shown in FIG. 1, the POE system 100 may include: PSE 110, network cables 120, and PDs 131 to 133. The PDs 131 to 133 are different types of PDs that receive data signals and power supply signals from the PSE, and include but are not limited to, for example, a network camera 131, an AP 132, a telephone set 133, and another PD not shown in the figure, such as a powered splitter, a personal computer (PC), or the like. The PDs 131 to 133 are connected to the PSE 110 through the network cables 120. The PSE 110 includes a plurality of POE subsystems, and each POE subsystem includes a plurality of ports. When the PDs 131, 132, and 133 are connected to the ports of the PSE 110, the PSE 110 may provide a direct current power supply to the PDs, that is, supply power to the PDs 131 to 133. The PSE may be, for example, a POE switch.

It should be understood that FIG. 1 is merely an example, and shows one PSE and three PDs connected to the PSE. The PSE, a quantity of ports provided by the PSE, and a quantity of PDs connected to the PSE are not limited in embodiments of this disclosure.

As described above, the PSE may supply power to a plurality of PDs at the same time. However, when total power consumed by the plurality of PDs increases or even exceeds entire available power of the PSE, the PSE may power off a PD on a low-priority port. When the total power consumed by the PDs decreases to allow the low-priority port to be powered on, the PSE can power on the low-priority port. Therefore, when the total power consumed by the PDs is close to the available power of the PSE, a problem of repeated power-on and power-off of the low-priority port is likely to occur.

To prevent the low-priority port from being repeatedly powered on and off, fixed reserved power is usually set for the PSE. If the entire available power of the PSE is PM, the reserved power is set to PR=PM×a, where 0<a≤1. Excluding the reserved power, actual available power of the PSE is PMr=PM×(1−a). However, this method reduces the actual available power of the PSE. As a result, some low-priority ports cannot be powered on all the time. Setting fixed reserved power is essentially to suppress power overload by sacrificing a part of power. However, power utilization is low because the actual available power of the PSE is reduced.

This disclosure provides a power management method for PSE. PSE determines reserved power based on a power usage status. Therefore, the reserved power proposed in embodiments of this disclosure can be flexibly adjusted, thereby avoiding a problem of a waste of reserved power and low power utilization caused by using fixed reserved power. In this way, as many PDs as possible can be powered on, and power utilization is improved.

The following describes in detail the power management method for PSE provided in embodiments of this disclosure with reference to the accompanying drawings.

For ease of understanding and description, several parameters involved in the following embodiments are first briefly described.

1. P: P is entire available power of the PSE, and P>0. It should be understood that, the entire available power of the PSE depends on the PSE, and represents a power supply capability of the PSE. Each PSE has fixed entire available power.

2. $P_s$: $P_s$ is reserved power of the PSE, and $P > P_s > 0$.

3. $P_t$: $P_t$ is actual available power of the PSE, and is a difference of the entire available power of the PSE minus the reserved power, that is, $P_t = P - P_s$, where $P_t > 0$.

4. $P_u$: $P_u$ is total power actually used by the PSE, and $P_u > 0$.

5. ΔP: ΔP is a power overload capacity, and is a difference of the total power actually used by the PSE minus the actual available power of the PSE, that is, $\Delta P = P_u - P_t$.

6. $P_{a1}$: $P_{a1}$ is applied power of a first port, where $P_{a1} > 0$.

7. $P_{r1}$: $P_{r1}$ is actually used power of the first port, where $P_{r1} > 0$.

8. $P_{a2}$: $P_{a2}$ is applied power of a second port, where $P_{a2} > 0$.

9. $P_{r2}$: $P_{r2}$ is actually used power of the second port, where $P_{r2} > 0$.

10. PO: PO is maximum allowable overload power of the second port, where PO>0.

It should be understood that in the embodiments shown below, the method is described by using PSE as an execution body. The PSE may be, for example, a POE switch.

It should be further understood that although the embodiments shown below are described by using PSE as an example, this should not constitute any limitation on the execution body of the method. The method provided in embodiments of this disclosure can be performed as long as a program that records code of the method provided in embodiments of this disclosure can be run. For example, the PSE may be replaced with a component configured in the PSE (for example, a chip, a chip system, or another functional module that can invoke and execute the program). This is not limited in embodiments of this disclosure.

Figure 2:
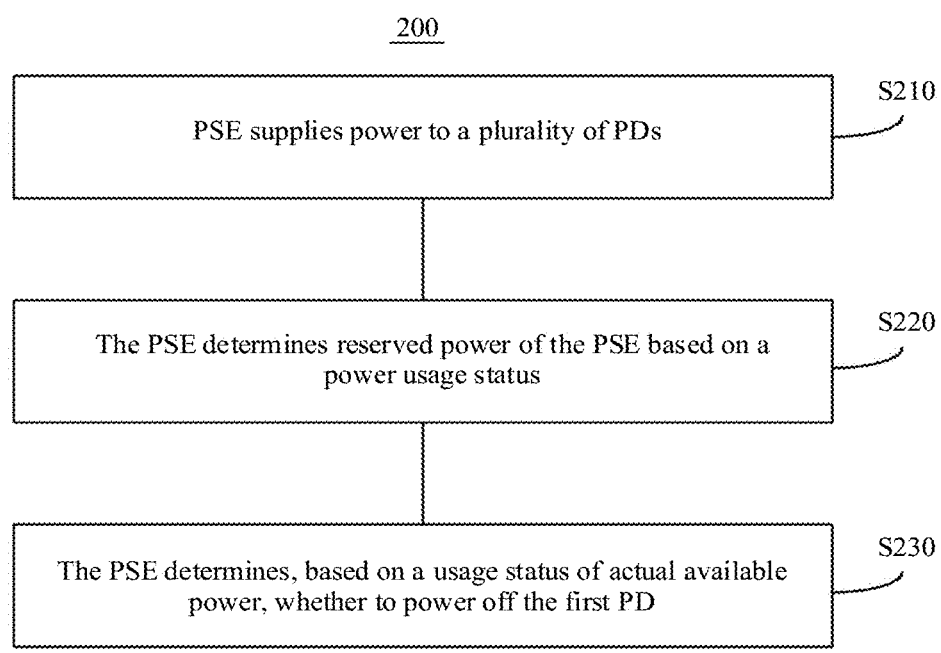
FIG. 2 is a schematic flowchart of a power management method for PSE according to an embodiment of this disclosure.

FIG. 2 is a schematic flowchart of a power management method 200 for PSE according to an embodiment of this disclosure. The method 200 shown in FIG. 2 may include S210 to S230. The following describes the steps in FIG. 2 in detail.

S210: PSE supplies power to a plurality of PDs.

As described above, the PSE has a plurality of ports, and may supply power to a plurality of PDs through the plurality of ports. In the plurality of ports of the PSE, each port is corresponding to one priority, and the priority of each port may be preset.

For example, the PSE has K (K>1 and is an integer) ports, which are respectively a port 1, a port 2, a port 3, . . . , and a port K. The PSE may preset a priority of each port in the port 1 to the port K. In a possible design, a larger priority value of a port indicates a higher priority. For example, if a priority value of the port 1 is 3, a priority value of the port 2 is 1, and a priority value of the port 3 is 6, a port with the lowest priority in the port 1 to the port 3 is the port 2, the port 1 has the second lowest priority, and the port 3 has the highest priority. In another possible design, a larger priority value of a port indicates a lower priority. For brevity, examples are not provided here. It should be understood that a correspondence between a priority value and a priority of a port is not limited in this embodiment of this disclosure.

S220: The PSE determines reserved power of the PSE based on a power usage status.

The reserved power $P_s$ may be used to continue supplying power to the plurality of PDs when actual available power $P_t$ of the PSE is exhausted, and the reserved power may vary with the power usage status of the PSE. The actual available power of the PSE is a difference of the entire available power of the PSE minus the reserved power.

Optionally, the power usage status may include a power usage status of a first port in the plurality of ports provided by the PSE, and the first port is a port with a lowest priority in a plurality of used ports of the PSE.

In a possible design, the PSE determines the reserved power of the PSE based on applied power of a PD connected to the first port.

For ease of differentiation and description, herein, the PD connected to the first port is denoted as a first PD, and the first PD is a PD connected to the port with the lowest priority. For example, the PSE determines the applied power of the first PD as the reserved power of the PSE. For another example, the PSE determines n times the applied power of the first PD as the reserved power of the PSE, where n is a constant greater than 1.

In another possible design, the PSE determines the reserved power of the PSE based on actually used power of the first PD connected to the first port. For example, the PSE determines m times the actually used power of the first PD as the reserved power of the PSE, where m is a constant greater than 1. It should be understood that the actually used power of the first PD is less than or equal to the applied power of the first PD.

It should be understood that the foregoing determining the reserved power of the PSE based on the applied power of the first PD and determining the reserved power of the PSE based on the used power of the first PD are merely two examples, and should not constitute any limitation on this embodiment of this disclosure. It should be further understood that the constants n and m may be the same or different. This is not limited in this embodiment of this disclosure.

Optionally, that the PSE determines reserved power based on a power usage status may further include: determining the reserved power based on a power change frequency of the PSE, where the power change frequency of the PSE indicates a change frequency of total power actually used by the PSE, for example, may be a change frequency of total power actually used by the PSE in two or more detection periodicities. Details are as follows. When the power change frequency of the PSE is greater than or equal to a preset first threshold, a first power value is determined as the reserved power; or when the power change rate of the PSE is less than the first threshold, a second power value is determined as the reserved power, where the first power value is greater than the second power value.

That is, when the power usage status of the PSE changes frequently, higher reserved power is used. When the power usage status of the PSE changes less frequently, lower reserved power is used.

It should be understood that the foregoing listed manners for determining the reserved power are merely examples, and should not constitute any limitation on this embodiment of this disclosure. For example, the reserved power may alternatively be determined based on a power change amplitude of the PSE; and when the power change amplitude of the PSE is large, large reserved power is used; or when the power change amplitude of the PSE is small, small reserved power is used. For brevity, other manners are not listed here one by one.

S230: The PSE determines, based on a usage status of the actual available power, whether to power off the first PD.

It should be understood that, when determining that a PD needs to be powered off, the PSE preferentially powers off the first PD connected to the port with the lowest priority. In other words, as long as the PSE determines that a PD needs to be powered off, the first PD connected to the port with the lowest priority is definitely powered off. After powering off the first PD, the PSE may continue to determine, according to the method provided in this embodiment of this disclosure, whether to power off a PD connected to a port with a lowest priority in the remaining PDs. Herein, for ease of understanding and description, the first PD is used as an example to describe a process in which the PSE determines, based on the usage status of the actual available power, whether a PD needs to be powered off.

The actual available power $P_t$ refers to a difference of the entire available power of the PSE minus the reserved power, that is, $P_t = P - P_s$. The PSE may determine, based on the usage status of the actual available power, whether to power off the first PD.

That the PSE determines, based on a usage status of the actual available power, whether to power off the first PD may include: continuing supplying power to the first PD when the actual available power is not exhausted; or powering off the first PD when accumulated duration in which the actual available power is exhausted but the reserved power is not exhausted reaches a preset threshold; or powering off the first PD when the reserved power is exhausted.

It should be understood that, when the accumulated duration in which the actual available power is exhausted but the reserved power is not exhausted does not reach the preset threshold, the PSE does not need to power off the first PD, and continues supplying power to the first PD.

The usage status of the actual available power of the PSE may be determined by a power overload capacity $\Delta P$. The power overload capacity may refer to a difference of the total power actually used by the PSE minus the actual available power of the PSE. Herein, the total power actually used by the PSE is a sum of actually used power of all powered-on PDs.

It may be understood that, if the power overload capacity is less than zero, it indicates that the total power actually used by the PSE is lower than the actual available power of the PSE, that is, the reserved power is not used. If the power overload capacity is equal to zero, it indicates that the total power actually used by the PSE is equal to the actual available power of the PSE, that is, the actual available power of the PSE is just exhausted. If the power overload capacity is greater than zero, it indicates that the total power actually used by the PSE exceeds the actual available power of the PSE, that is, the reserved power has been used. If the power overload capacity is greater than the reserved power, it indicates that the reserved power is exhausted.

Therefore, in a possible implementation, before S230, the method further includes: the PSE may determine the power overload capacity. The PSE may determine the power overload capacity based on the total power actually used by the PSE and the actual available power of the PSE, and determine, based on the power overload capacity, whether the actual available power of the PSE is exhausted and whether the reserved power of the PSE is exhausted.

In other words, that the PSE determines, based on a usage status of the actual available power, whether to power off the first PD may be replaced by that the PSE determines, based on the power overload capacity, whether to power off the first PD. The PSE may continue supplying power to the first PD when the power overload capacity is less than zero; power off the first PD when accumulated duration in which the power overload capacity is greater than or equal to zero but less than the reserved power reaches a preset threshold; or power off the first PD when the power overload capacity is greater than or equal to the reserved power.

As mentioned above, there may be a plurality of different designs for setting the reserved power. In the following, an example in which the PSE determines the applied power of the first PD on the first port as the reserved power is used, and cases in which the power overload capacity is in different ranges is divided to obtain three intervals, which are a first interval, a second interval, and a third interval respectively. The first interval is (−∞, 0), the second interval is [0, $P_s$), and the third interval is [$P_s$, +∞). If the power overload capacity falls into the first interval, the PSE continues powering on the plurality of PDs including the first PD; powers off the first PD if accumulated duration in which the power overload capacity falls into the second interval reaches a preset threshold; or powers off the first PD if the power overload capacity falls into the third interval. In this way, the PSE may determine, based on the power overload capacity and the plurality of predefined intervals, whether to power off the first PD.

Further, that the actual available power of the PSE is exhausted but the reserved power is not exhausted may be divided into two cases. In one case, the power overload capacity is greater than or equal to zero (that is, the actual available power of the PSE is exhausted) but is less than the actually used power of the first PD, that is, a part of the power used by the first PD comes from the actual available power of the PSE, and the other part comes from the reserved power. In the other case, the power overload capacity is greater than or equal to the actually used power of the first PD but less than the reserved power. In other words, in addition to the first PD, there may be another PD that also uses the reserved power. In the two cases, remaining reserved power is different. Remaining reserved power in the former case is greater than that in the latter case. Therefore, in the former case, a larger power headroom can be provided to cope with power overload, and reliability is higher. Therefore, for the foregoing two cases, different accumulated duration thresholds may be set respectively, to determine whether to power off the first PD. For example, an accumulated duration threshold that is set in the former case may be greater than an accumulated duration threshold that is set in the latter case.

Optionally, the preset thresholds include a first preset threshold and a second preset threshold, where the first preset threshold is greater than the second preset threshold. It should be understood that both the first preset threshold and the second preset threshold are accumulated duration thresholds, and different values are respectively set only for distinguishing the foregoing two different cases. That is, the second interval may be further divided into two subintervals, which may be denoted as a trigger zone and a dangerous zone respectively. The trigger zone is [0, $P_{r1}$), that is, the power overload capacity is greater than or equal to zero but less than the actually used power of the first PD. The dangerous zone is [$P_{r1}$, $P_s$), that is, the power overload capacity is greater than or equal to the actually used power of the first PD but less than the reserved power.

For example, that the PSE powers off the first PD when the accumulated duration in which the actual available power is exhausted but the reserved power is not exhausted reaches the preset threshold includes: the PSE powers off the first PD when accumulated duration in which the power overload capacity is greater than or equal to zero and less than the actually used power of the first PD reaches the first preset threshold; and the PSE powers off the first PD when accumulated duration in which the power overload capacity is greater than or equal to the actually used power of the first PD and less than the reserved power reaches the second preset threshold.

In conclusion, it can be learned that, when any one of the following power-off conditions is met, the PSE may power off the first PD:

Condition 1: The accumulated duration in which the power overload capacity is greater than or equal to zero and less than the actually used power of the first PD reaches the first preset threshold.

Condition 2: The accumulated duration in which the power overload capacity is greater than or equal to the actually used power of the first PD and less than the reserved power reaches the second preset threshold.

Condition 3: The power overload capacity is greater than or equal to the reserved power.

After powering off the first PD, the PSE may further determine, with reference to a power usage status of the PSE, whether the first PD needs to be powered on again.

In a possible implementation, the PSE powers on the first PD again when remaining power is greater than the applied power of the first PD. The remaining power is a difference of the actual available power minus total power actually used by the PSE after the first PD is powered off. It should be noted that the total power actually used by the PSE after the first PD is powered off is a sum of actually used power of all powered-on PDs except the first PD after the first PD is powered off.

It should be understood that all the powered-on PDs except the first PD are all remaining powered-on PDs after the first PD is powered off. Actually used power of each PD fluctuates in real time based on a usage status, for example, when load of one or more PDs connected to one or more ports becomes smaller, actually used power of the one or more PDs decreases. If the total power actually used by all the remaining powered-on PDs is reduced by a large enough amount to meet a case in which the remaining power is greater than the applied power of the first PD, the first PD is powered on again. After the first PD is powered on again, because power actually used by the first PD is less than or equal to the applied power, total power actually used by the PSE in this case is less than the actual available power of the PSE, and a reserved power headroom is still reserved, so that the first PD is not easily triggered to be powered off again. Therefore, a problem of repeated power-on and power-off of the first PD can be alleviated.

As mentioned above, the reserved power of the PSE may be dynamically adjusted. For example, after the first PD is powered off, the reserved power of the PSE may be adjusted, for example, based on applied power or actually used power of a PD with a lowest priority in remaining powered-on PDs after the first PD is powered off. After the first PD is powered on, the first PD becomes the PD with the lowest priority in the powered-on PDs. Therefore, the reserved power of the PSE may be adjusted based on the applied power or the actually used power of the first PD.

Certainly, the reserved power of the PSE may alternatively be adjusted based on a power change rate. Details are not described herein again.

Figure 3:
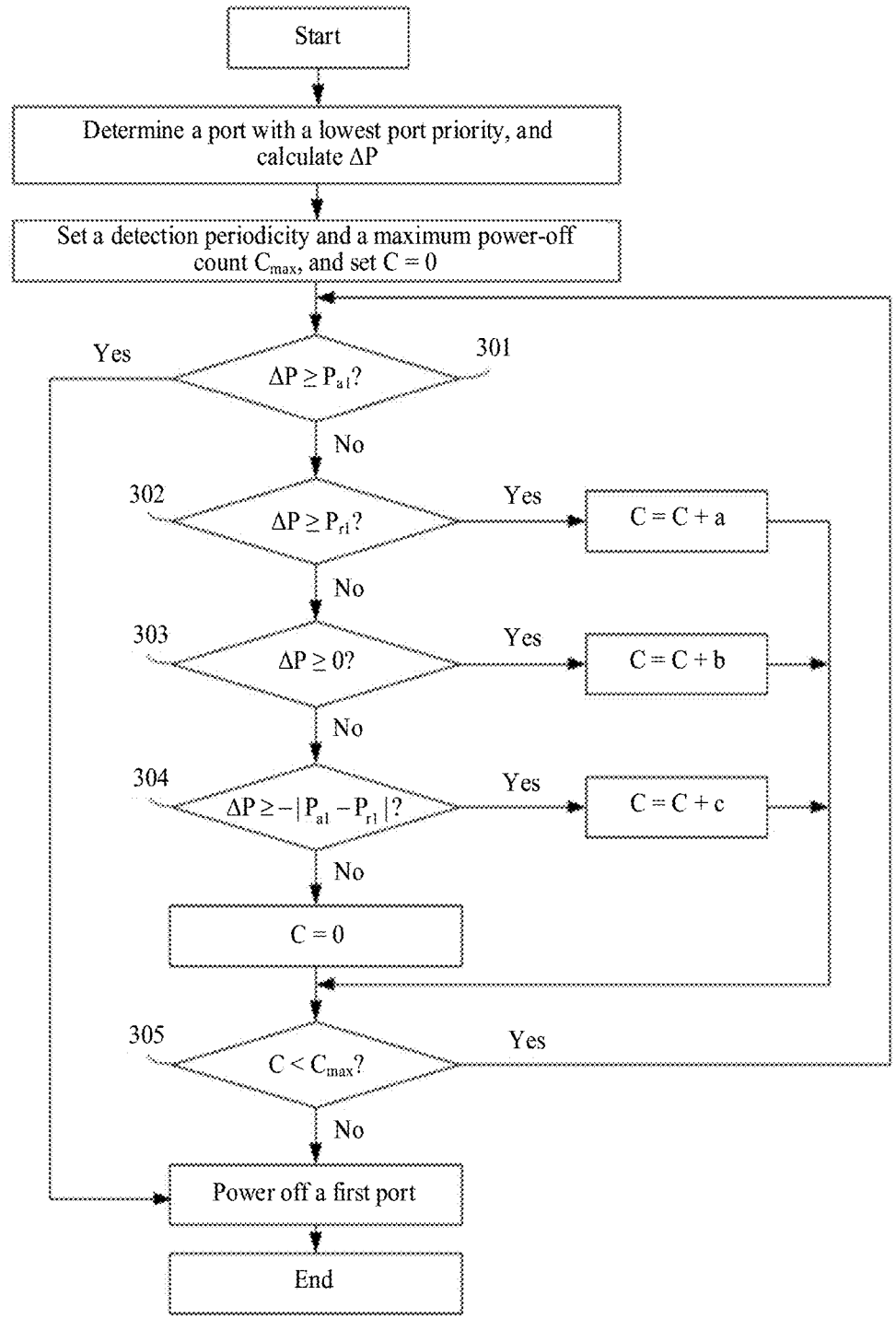
FIG. 3 is a schematic diagram of a specific algorithm used to implement a power management method for PSE according to an embodiment of this disclosure.

FIG. 3 provides a specific algorithm used to implement the foregoing power management method for PSE. The following describes the specific algorithm in detail with reference to the procedure shown in FIG. 3. It should be understood that the following algorithm of the power management method is merely a possible specific implementation of the power management method for PSE provided in this disclosure, and should not be construed as any limitation on an implementation of the method.

In the embodiment shown in FIG. 3, it is assumed that the first port is a port with a lowest priority in all powered-on ports, and applied power of a PD connected to the first port is set as the reserved power. The case in which the actual available power is not exhausted is further divided into a stable zone and a critical zone of power, the case in which the actual available power is exhausted but the reserved power is not exhausted is further divided into a trigger zone and a dangerous zone of power, and the case in which the reserved power is exhausted is denoted as a power-off zone. An interval of the stable zone is $(-\infty, -|P_{a1}-P_{r1}|)$. $P_{a1}$ is the applied power of the PD connected to the first port, that is, the reserved power, and $P_{r1}$ is actually used power of the PD connected to the first port. An interval of the critical zone is $[-|P_{a1}-P_{r1}|, 0)$, an interval of the trigger zone is $[0, P_{r1})$, an interval of the dangerous zone is $[P_{r1}, P_{a1})$, and an interval of the power-off zone is $[P_{a1}, +\infty)$.

The critical zone, the trigger zone, and the dangerous zone respectively correspond to different count factors. For example, the critical zone corresponds to a first count factor c, c is a negative number, the trigger zone corresponds to a second count factor b, the dangerous zone corresponds to a third count factor a, a>b, and a and b are positive numbers. It should be understood that "first", "second", and "third" are merely used for distinguishing the count factors corresponding to different intervals, and should not constitute any limitation on a sequence thereof.

A count value C is a sum of a most recently updated count value and a count factor corresponding to an interval into which the power overload capacity falls, and a count factor corresponding to the first interval is less than a count factor corresponding to the second interval. That is, the count value is an accumulated value of count factors corresponding to different intervals when the power overload capacity changes dynamically and is in different intervals.

As shown in FIG. 3, the PSE determines a port with a lowest priority in all powered-on ports, that is, the first port, and calculates the actual available power $P_t$ and the power overload capacity $\Delta P$ of the PSE. The PSE may set a detection periodicity and a maximum power-off count $C_{max}$. The initial count value C is 0. Then, the PSE determines an interval into which the power overload capacity falls. It is determined, based on the count value C and the predefined maximum power-off count $C_{max}$, whether to continue supplying power to the plurality of PDs. If $C \leq C_{max}$, the PSE continues supplying power to the plurality of PDs; or if $C > C_{max}$, one or more PDs in the plurality of PDs are powered off. It should be understood that powering off a port in this specification is powering off a PD connected to the port, and meanings expressed by the two are the same, and may be used alternately for convenience.

Step 301: Determine whether the power overload capacity is greater than or equal to $P_{a1}$; and if yes, power off the first port directly; or if no, perform step 302.

Step 302: Continue to determine whether the power overload capacity is greater than or equal to $P_{r1}$, that is, determine whether the power overload capacity falls into the dangerous zone; and if yes, determine that the count value is a sum of the most recently updated count value and the third count factor a, that is, C=C+a, where a is the count factor corresponding to the dangerous zone, and further perform step 305; or if no, perform step 303.

Step 303: Determine whether the power overload capacity is greater than or equal to 0, that is, whether the power overload capacity falls into the trigger zone; and if yes, determine that the count value is a sum of the most recently updated count value and the second count factor b, that is, C=C+b, where b is the count factor corresponding to the trigger zone, and further perform step 305; or if no, perform step 304.

Step 304: Determine whether the power overload capacity is greater than or equal to $-|P_{a1}-P_{r1}|$, that is, whether the power overload capacity falls into the critical zone; and if yes, determine that the count value is a sum of the most recently updated count value and the first count factor c, that is, C=C+c, where c is the count factor corresponding to the critical zone, and c is a negative number, and further perform step 305; or if no, it indicates that the power overload capacity falls into the stable zone, set the count value to zero, that is, update C to 0, and then perform step 305.

Step 305: Determine whether C is less than $C_{max}$; and if yes, return to step 301; or if no, power off the first port.

It should be understood that because the power overload capacity falling into the dangerous zone is more dangerous than falling into other zones, the count factor corresponding to this zone may be slightly larger than that corresponding to the other zones. If the power overload capacity falls into the critical zone, although power-off is not triggered, the actual available power of the PSE is to be exhausted, which may cause a power-off risk compared with the stable zone. Therefore, a relatively small count factor may be designed. In conclusion, a value relationship of the count factors a, b, and c may be a>b>c. It should be further understood that a value of the maximum power-off count $C_{max}$ is not limited in this embodiment of this disclosure. For example, the maximum power-off count may be set but not limited to 50.

It should be noted that duration of a sampling periodicity depends on a capability of the PSE to perform the foregoing algorithm, for example, may be 100 milliseconds (ms), 10 ms, or the like. Duration of the detection periodicity is not limited in this embodiment of this disclosure.

Figure 4:
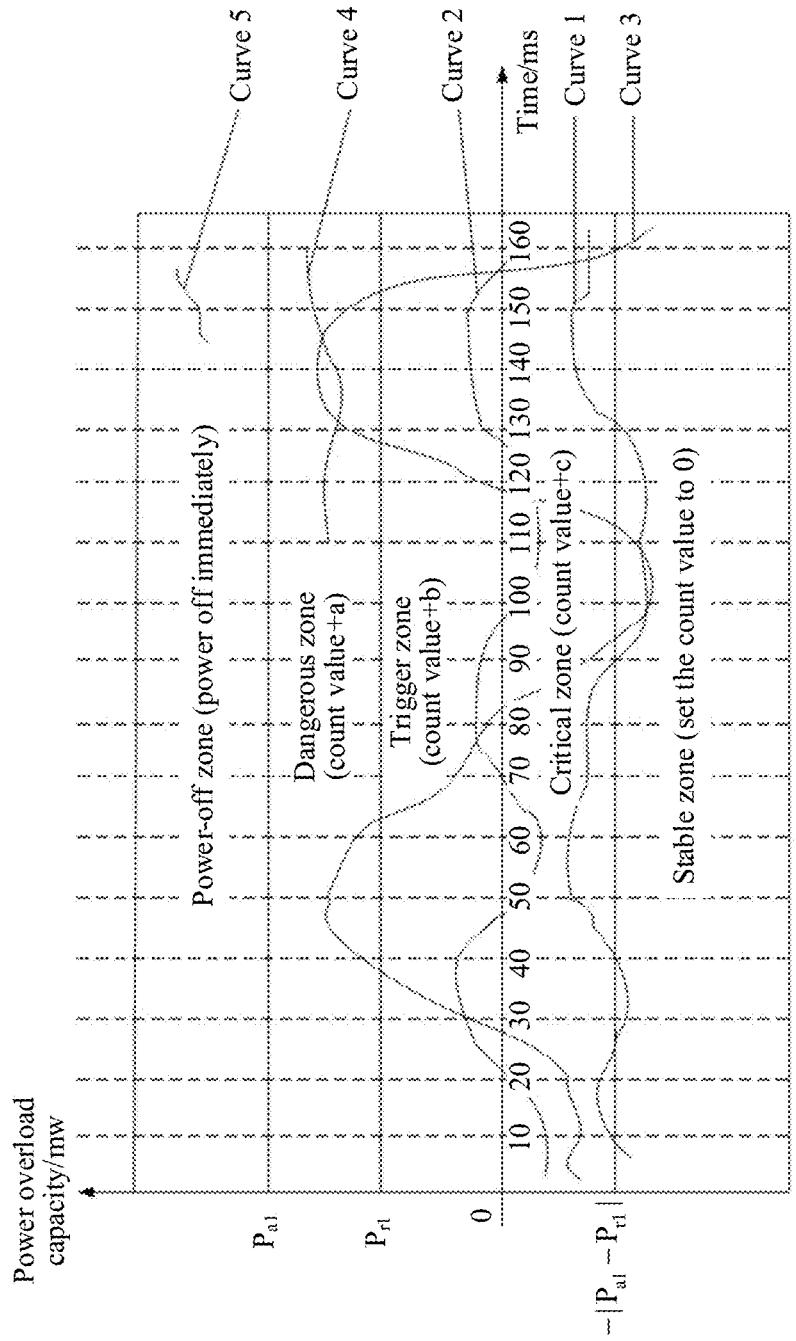
FIG. 4 is a schematic diagram of power overload capacity partitioning according to an embodiment of this disclosure.

FIG. 4 is a schematic diagram of power overload capacity partitioning according to an embodiment of this disclosure. In FIG. 4, the horizontal axis represents time in the unit of ms, and the vertical axis represents the power overload capacity in the unit of milliwatt (mW). FIG. 4 shows curves obtained through sampling in a plurality of detection periodicities. An interval between every two vertical dashed lines represents one detection periodicity, for example, the detection periodicity is 10 ms. As shown in FIG. 4, curve 1 indicates that the total power actually used by all PDs is not overloaded and power-off is not required. Curve 2 indicates that the power is recovered immediately after overload, and power-off is not required. Curve 3 indicates that a jitter zone is sampled, that is, jitters occur in the five zones, and power-off is not required. Curve 4 indicates that the count value is greater than or equal to the maximum power-off count, and the first PD on the first port is powered off. Curve 5 indicates that the power overload capacity exceeds the reserved power, that is, the reserved power is exhausted, and the first PD is powered off immediately.

It should be understood that the power-off zone, the dangerous zone, the trigger zone, the critical zone, and the stable zone that are shown above with reference to FIG. 3 and FIG. 4 are merely examples, and should not constitute any limitation on this embodiment of this disclosure. For example, the critical zone and the stable zone may be combined into one zone, or the dangerous zone and the trigger zone may be combined into one zone.

According to the foregoing technical solutions, the PSE dynamically determines the reserved power of the PSE based on the power usage status, so that the reserved power varies with the power usage status of the PSE, and the PSE can supply power to more PDs to a greater extent, thereby improving power utilization. In addition, when the actual available power of the PSE is greater than the total power that is actually used, the PSE may power on the powered-off first PD again. Because the reserved power is set, the powered-on first PD is not easily powered off again. Therefore, the problem of repeated power-on and power-off of a PD on a low-priority port can be alleviated.

It should be understood that, in the embodiment shown above, dynamically adjusted reserved power is used as an example to describe the power management method for PSE. However, this shall not constitute any limitation on embodiments of this disclosure. When the reserved power is fixed, the PSE may still determine, based on the power overload capacity and the plurality of predefined intervals, whether to continue supplying power to the plurality of currently connected PDs.

Figure 5:
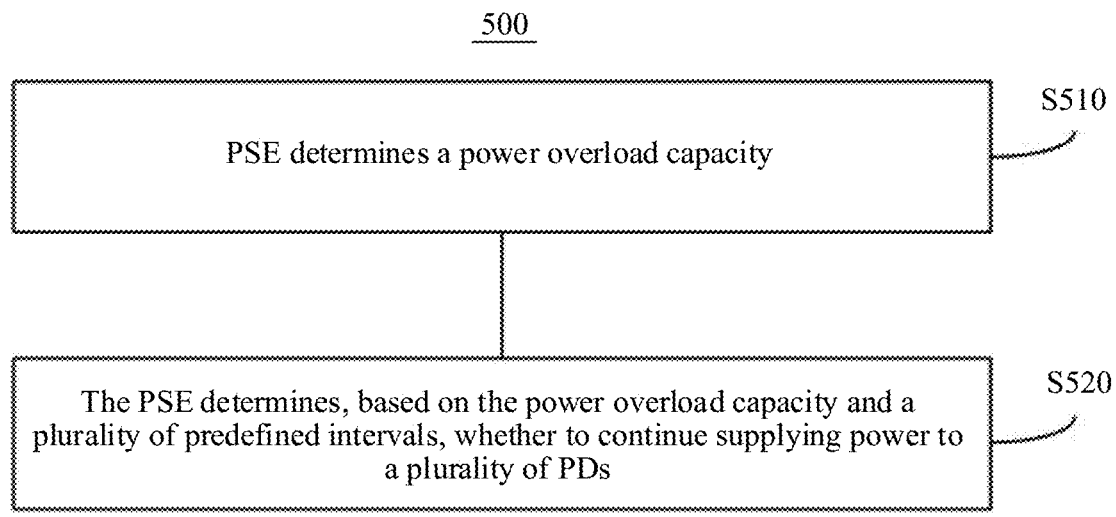
FIG. 5 is another schematic flowchart of a power management method for PSE according to an embodiment of this disclosure.

The following describes in detail a power management method for PSE provided in another embodiment of this disclosure with reference to FIG. 5. FIG. 5 is another schematic flowchart of a power management method 500 for PSE according to an embodiment of this disclosure. The method 500 shown in FIG. 5 may include S510 and S520.

S510: PSE determines a power overload capacity.

The power overload capacity ΔP is a difference of total power actually used by the PSE when the PSE supplies power to a plurality of PDs minus actual available power of the PSE, that is, $\Delta P = P_u - P_t$. The total power that is actually used is a sum of actually used power of a plurality of powered-on ports, and the actual available power of the PSE is a difference of entire available power of the PSE minus reserved power, that is, $P_t = P - P_s$.

It should be understood that in this embodiment, the reserved power of the PSE may be dynamically adjustable as described above. For example, the reserved power is set based on applied power or actually used power of a PD connected to a port with a lowest priority. Alternatively, the reserved power may be fixed. For example, a times the entire available power of the PSE is used as the reserved power. This is not limited in this embodiment of this disclosure.

S520: The PSE determines, based on the power overload capacity and a plurality of predefined intervals, whether to continue supplying power to the plurality of PDs.

The plurality of predefined intervals are a first interval, a second interval, and a third interval. The first interval is (−∞, 0), the second interval is [0, $P_s$), $P_s$ is the reserved power, and the third interval is [$P_s$, +∞). If the power overload capacity falls into the first interval, the PSE continues powering on the plurality of PDs; if the power overload capacity falls into the second interval, powers off one or more PDs of the plurality of PDs when accumulated duration in which the power overload capacity falls into the second interval reaches a preset threshold; or if the power overload capacity falls into the third interval, powers off one or more PDs of the plurality of PDs.

It should be understood that the powering off one or more PDs includes powering off the PD connected to the port with the lowest priority, that is, powering off a first PD connected to a first port.

For example, when determining that a PD needs to be powered off, the PSE may power off one PD. For example, the PSE preferentially powers off the PD connected to the port with the lowest priority, that is, powers off the first PD. Alternatively, the PSE may simultaneously power off a plurality of PDs. For example, the PSE may simultaneously power off the PD connected to the port with the lowest priority and a PD connected to a port with the second lowest priority.

For example, the following uses an example in which the PSE determines the applied power of the first PD on the first port as the reserved power, and the first interval and the second interval are partitioned. The first port is a port with a lowest priority in a plurality of used ports of the PSE.

Further, the first interval may be divided into a stable zone and a critical zone, where the stable zone is (−∞, −|$P_s - P_{r1}$|), and the critical zone is [−|$P_s - P_{r1}$|, 0). $P_{r1}$ is actually used power of the first PD connected to the first port of the PSE. The second interval is divided into a trigger zone and a dangerous zone, where the trigger zone is [0, $P_{r1}$), and the dangerous zone is [$P_{r1}$, $P_s$). For details, refer to related descriptions in FIG. 2. Details are not described herein again.

Optionally, the preset threshold for the accumulated duration in which the power overload capacity falls into the second interval includes: a first preset threshold and a second preset threshold, where the first preset threshold is greater than the second preset threshold.

For example, the powering off the first PD when the accumulated duration in which the power overload capacity falls into the second interval reaches the preset threshold includes: powering off the first PD when accumulated duration in which the power overload capacity falls into the trigger zone reaches the first preset threshold; or powering off the first PD when accumulated duration in which the power overload capacity falls into the dangerous zone reaches the second preset threshold. It may be understood that a situation in which the power overload capacity is in the dangerous zone is more dangerous. Therefore, the second preset threshold is less than the first preset threshold. For details, refer to related descriptions in FIG. 2. Details are not described herein again.

After powering off the first PD, the PSE further needs to determine, with reference to a power usage status of the PSE, whether the first PD needs to be powered on again.

In a possible implementation, the PSE powers on the first PD again when remaining power is greater than the applied power of the first PD, where the remaining power is a difference of the actual available power minus total power actually used by the PSE after the first PD is powered off.

For a specific algorithm of the foregoing power management method and a schematic diagram of power overload capacity partitioning, refer to FIG. 3 and FIG. 4. For brevity, details are not described herein again.

According to the foregoing technical solutions, the PSE determines the power overload capacity, predefines the first interval, the second interval, and the third interval, dynamically monitors an interval in which the power overload capacity is located and accumulated duration in which the power overload capacity is located in the interval, and determines whether to power off one or more PDs. Different intervals are divided, and accumulated duration in which the power overload capacity is located in an interval is monitored in real time, so that one or more PDs are not easily powered off. Therefore, a problem of repeated power-on and power-off of a PD connected to a low-priority port can be alleviated.

Figure 6:
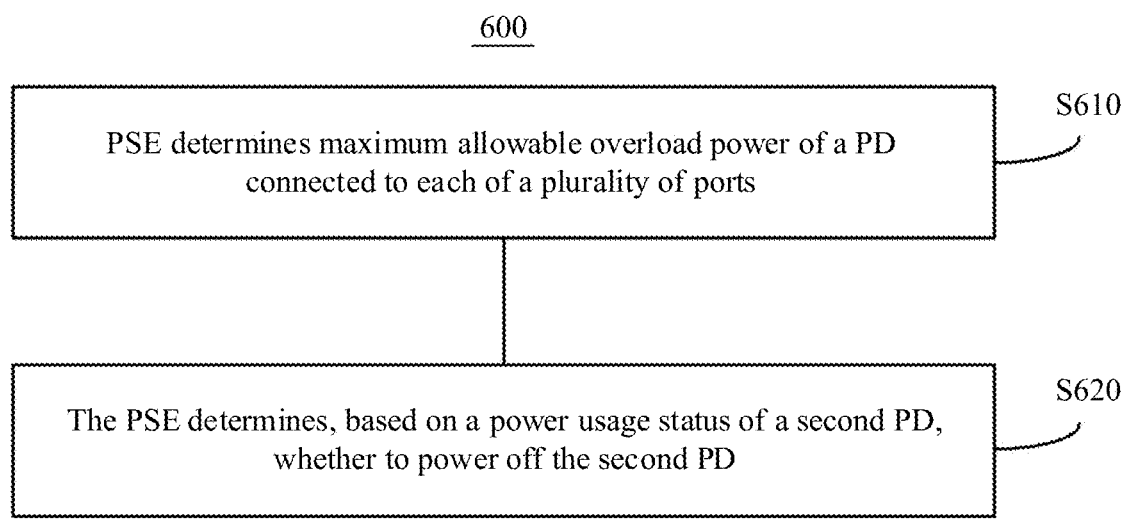
FIG. 6 is a schematic flowchart of a power management method for PSE according to another embodiment of this disclosure.

It should be understood that the power management method for PSE described above is for total power of the PSE. In another implementation, the PSE may further manage power of each provided port. The following embodiment described with reference to FIG. 6 is an example of performing power management by using a port as an example. The procedure shown in FIG. 6 is described in detail below.

FIG. 6 is a schematic flowchart of a power management method 600 for PSE according to another embodiment of this disclosure. The method 600 shown in FIG. 6 includes S610 and S620.

S610: PSE determines maximum allowable overload power of a PD connected to each of a plurality of ports.

The maximum allowable overload power of the PD is maximum power that the PD can bear when actually used power exceeds applied power. The maximum allowable overload power of the PD connected to each port is related to the applied power of the PD connected to the port, for example, may be the applied power plus a fixed power value, or may be the applied power plus a percentage of the applied power, or may be g (g≥1) times the applied power. This is not limited in this embodiment of this disclosure. For example, if applied power of a PD is 20 W, maximum allowable overload power of the PD is 20+10%×20=22 W.

The following uses a second port as an example to describe in detail a power management method for each of a plurality of powered-on ports. The second port is any port of the plurality of powered-on ports. For ease of differentiation and description, a PD connected to the second port is denoted as a second PD, and the second PD is a PD connected to any port.

S620: The PSE determines, based on a power usage status of the second PD, whether to power off the second PD.

It should be understood that the power usage status of the second PD may be determined based on actually used power of the second PD. Further, the PSE may determine, based on a value of the actually used power of the second PD, whether to power off the second PD.

The PSE powers off the second PD when accumulated duration in which the actually used power of the second PD is greater than applied power of the second PD but is less than or equal to maximum allowable overload power of the second PD reaches a third preset threshold; or powers off the second PD when the actually used power of the second PD is greater than the maximum allowable overload power; or continues supplying power to the second PD when the actually used power of the second PD is less than or equal to the applied power.

For example, to distinguish cases in which the actually used power of the second PD is in different ranges, different zones may be obtained through division, and are respectively a stable zone, a trigger region, and a power-off zone. The stable zone is $(0, P_{a2}]$, where $P_{a2}$ is the applied power of the second PD; the trigger zone is $(0, PO]$, where PO is the maximum allowable overload power of the second PD; and the power-off zone is $(PO, +\infty)$. If the actually used power of the second PD falls into the stable zone, the PSE may continue supplying power to the second PD. If the actually used power of the second PD falls into the trigger zone, the PSE further determines accumulated duration in which the actually used power falls into the trigger zone, and if the accumulated duration reaches the third preset threshold, the PSE powers off the second PD. If the actually used power of the second PD falls into the power-off zone, the PSE powers off the second PD.

Figure 7:
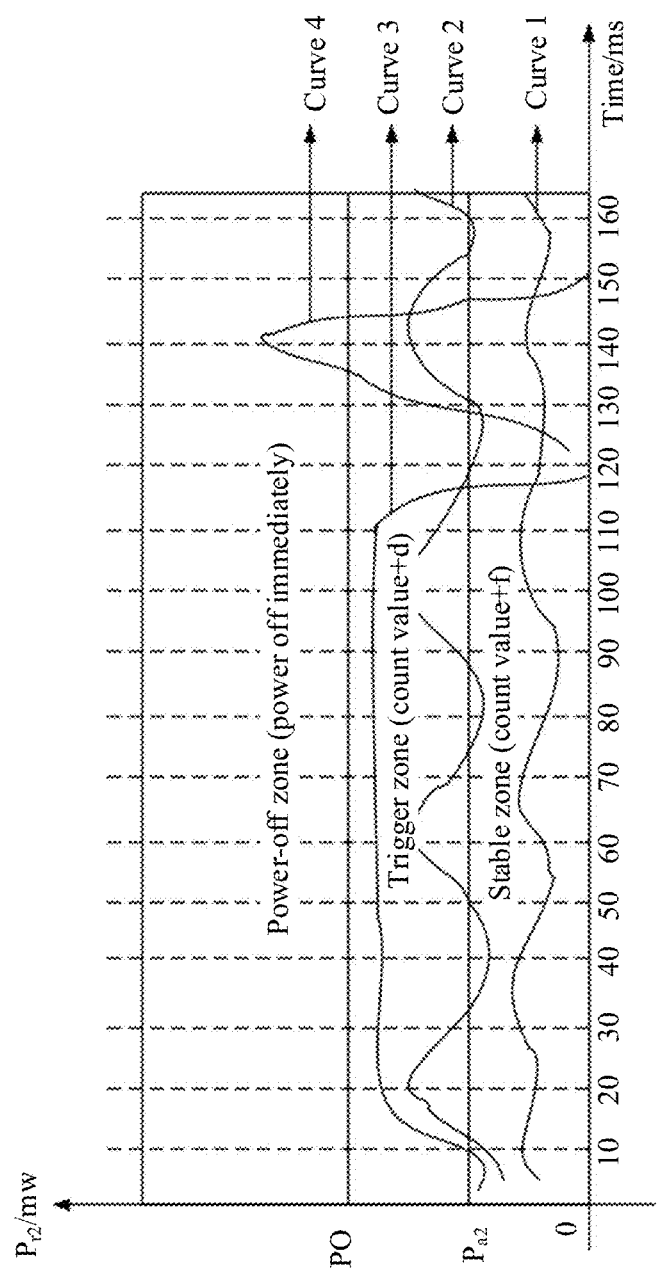
FIG. 7 is a schematic diagram of partitioning of actually used power of a second PD according to an embodiment of this disclosure.

FIG. 7 is a schematic diagram of partitioning of the actually used power of the second PD according to an embodiment of this disclosure. In FIG. 6, the horizontal axis represents time in the unit of ms, and the vertical axis represents the actually used power of the second PD in the unit of mw. FIG. 7 shows curves obtained through sampling in a plurality of detection periodicities. An interval between every two dashed lines represents one detection periodicity, for example, the detection periodicity is 10 ms. As shown in FIG. 7, curve 1 indicates that the actually used power of the second PD is not overloaded and power-off is not required. Curve 2 indicates that the actually used power of the second PD recovers immediately after being overloaded, a count value is less than a maximum power-off count, and power-off is not required. Curve 3 indicates that overload continuously occurs, a count value is greater than or equal to a maximum power-off count, and the second PD needs to be powered off. Curve 4 indicates that the actually used power of the second PD is greater than the maximum allowable overload power, and the second PD is powered off immediately.

The following describes in detail a specific algorithm used to implement the foregoing power management method for each port. It should be understood that the following algorithm of the power management method is merely a possible specific implementation of the power management method for each port provided in this disclosure, and should not be construed as any limitation on an implementation of the method.

Figure 8:
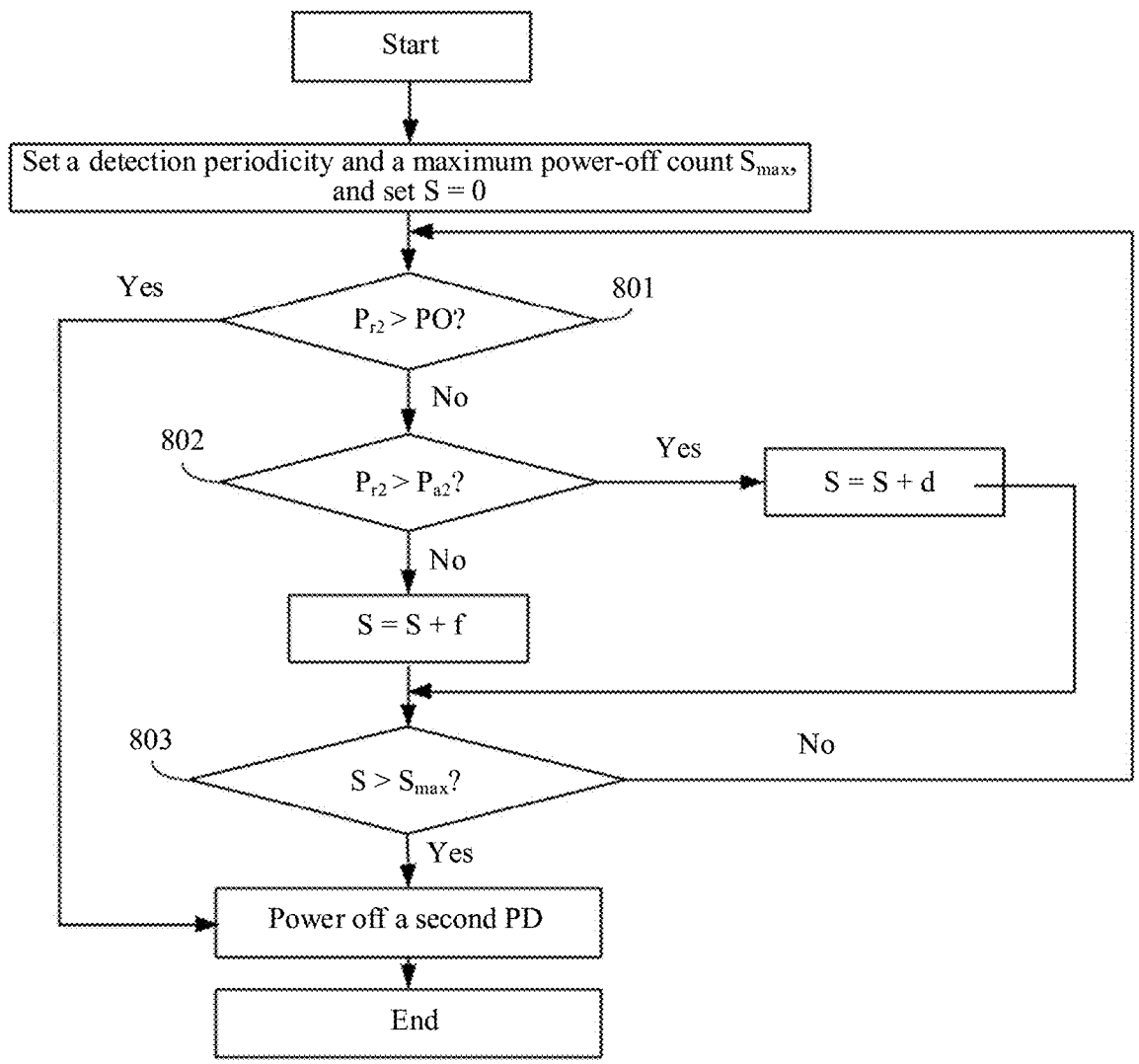
FIG. 8 is a flowchart of a specific algorithm of a power management method for each port according to an embodiment of this disclosure.

The following describes in detail an algorithm of the power management method for each port with reference to FIG. 8. FIG. 8 is a flowchart of a specific algorithm of a power management method for each port according to an embodiment of this disclosure.

In the embodiment shown in FIG. 8, a second port is any port of powered-on ports, a second PD is a PD connected to the second port, $P_{r2}$ is actually used power of the second PD, $P_{a2}$ is applied power of the second PD, and PO is maximum allowable overload power of the second PD.

As shown in FIG. 8, the PSE sets a detection periodicity and a maximum power-off count $S_{max}$, sets an initial count value S to 0, and then determines an interval into which the actually used power of the second PD falls.

Step 801: Determine whether the actually used power $P_{r2}$ of the second PD is greater than the maximum allowable overload power PO, that is, whether the actually used power of the second PD falls into a power-off zone; and if yes, power off the second PD; or if no, perform step 802.

Step 802: Determine whether $P_{r2}$ is greater than the applied power $P_{a2}$, that is, whether the actually used power of the second PD falls into a trigger zone; and if yes, S=S+d, and continue to perform step 803; or if no, S=S+f, and continue to perform step 803, where d is a positive number, and f is a negative number.

Step 803: Determine whether S is greater than $S_{max}$, that is, whether accumulated duration in which the actually used power of the second PD falls into the trigger zone is greater than a third preset threshold; and if yes, power off the second PD; or if no, return to step 801.

According to the foregoing technical solutions, the PSE determines, based on a power usage status of a PD connected to each port, whether to power off the PD, thereby reducing a jitter phenomenon of each port, and further preventing used power of the PD from being excessively high, so as to protect the PD.

It should be understood that the listed relationship between count factors and relationship between the count value and the maximum power-off count are merely examples, and shall not constitute any limitation on this disclosure. Based on the same idea, equivalent substitutions may be made for the relationships, for example, a, b, and $C_{max}$ are designed as negative numbers and c is designed as a positive number. This disclosure includes but is not limited thereto.

It should be further understood that the embodiment shown in FIG. 2 and the embodiment shown in FIG. 6 described above may be used together, or may be used separately. When the embodiment shown in FIG. 2 and the embodiment shown in FIG. 6 are used together, more PDs can be powered on, thereby improving power utilization. In addition, port jitter caused by repeated power-on and power-off of a PD on each port of the PSE can be reduced.

Figure 9:
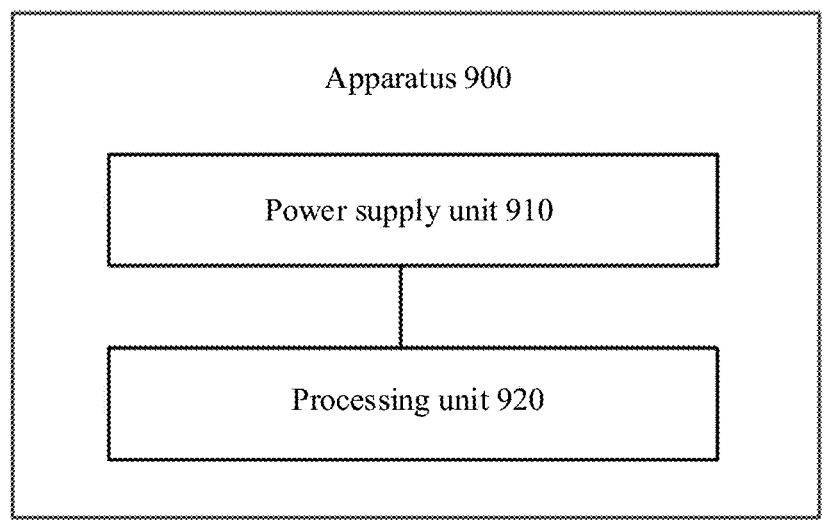
FIG. 9 is a schematic block diagram of a power management apparatus for PSE according to an embodiment of this disclosure.
Figure 10:
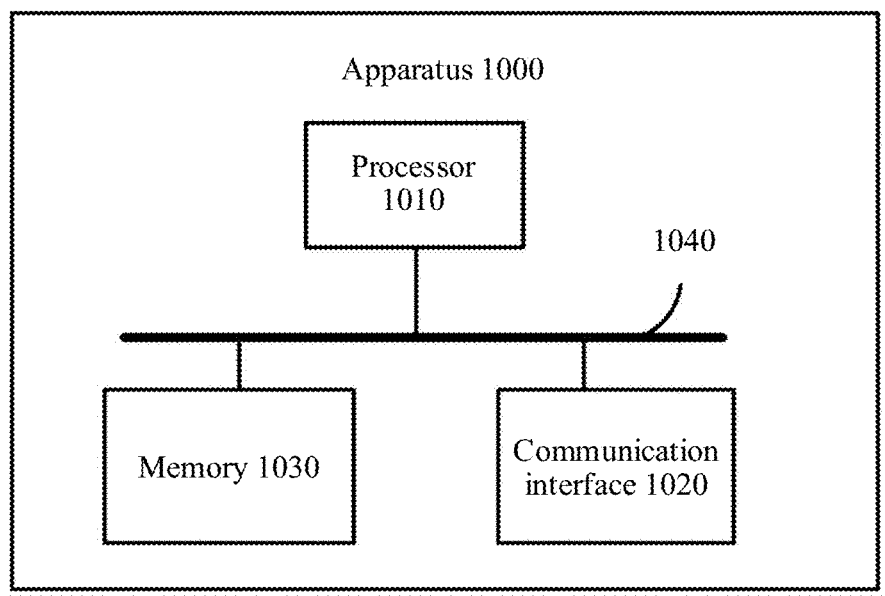
FIG. 10 is another schematic block diagram of a power management apparatus for PSE according to an embodiment of this disclosure.

The following describes in detail a power management apparatus for PSE provided in embodiments of this disclosure with reference to FIG. 9 and FIG. 10.

FIG. 9 is a schematic block diagram of a power management apparatus 900 for PSE according to an embodiment of this disclosure. As shown in FIG. 9, the apparatus 900 may include: a power supply unit 910 and a processing unit 920.

For example, the apparatus 900 may be corresponding to the PSE in the foregoing method embodiment, or a component configured in the PSE, for example, a chip or a chip system. In addition, units in the apparatus 900 may be configured to implement corresponding procedures performed by the PSE in the method shown in FIG. 2. For example, the power supply unit 910 may be configured to supply power to a plurality of PDs. For details, refer to detailed descriptions of S210 in the embodiment shown in FIG. 2. Details are not described herein again. The processing unit 920 may be configured to determine reserved power of the PSE based on a power usage status, where the reserved power is used to continue supplying power to the plurality of PDs when actual available power of the PSE is exhausted, and the reserved power varies with the power usage status of the PSE. For details, refer to the detailed description of S220 in the embodiment shown in FIG. 2. Details are not described herein again.

Optionally, the power usage status includes a power usage status of a first port in the plurality of ports provided by the PSE, and the first port is a port with a lowest priority in a plurality of used ports of the PSE. The processing unit 920 is configured to determine the reserved power of the PSE based on applied power or used power of a first PD connected to the first port. For details, refer to the detailed description of S220 in the embodiment shown in FIG. 2. Details are not described herein again.

Optionally, the processing unit 920 is configured to determine the applied power of the first PD connected to the first port or n times the applied power of the first PD as the reserved power of the PSE, where n is a constant greater than 1; or determine m times the actually used power of the first PD as the reserved power of the PSE, where m is a constant greater than 1. For details, refer to the detailed description of S220 in the embodiment shown in FIG. 2. Details are not described herein again.

Optionally, the power usage status includes a power change frequency of the PSE, and the power change frequency of the PSE indicates a change frequency of total power actually used by the PSE. The processing unit 920 is configured to determine a first power value as the reserved power when the power change rate is greater than or equal to a preset first threshold; or determine a second power value as the reserved power when the power change rate is less than the first threshold. The first power value is greater than the second power value. For details, refer to the detailed description of S220 in the embodiment shown in FIG. 2. Details are not described herein again.

Optionally, the processing unit 920 is further configured to determine the actual available power, where the actual available power is a difference of entire available power of the PSE minus the reserved power. The power supply unit 910 is configured to continue supplying power to the first PD when the actual available power is not exhausted; or power off the first PD when accumulated duration in which the actual available power is exhausted but the reserved power is not exhausted reaches a preset threshold; or power off the first PD when the reserved power is exhausted. For details, refer to the detailed description of S230 in the embodiment shown in FIG. 2. Details are not described herein again.

Optionally, the processing unit 920 is further configured to determine a power overload capacity, where the power overload capacity is a difference of total power actually used by the PSE minus the actual available power of the PSE; and when the power overload capacity is greater than or equal to zero and less than the reserved power, the processing unit 920 is configured to determine that the actual available power is exhausted but the reserved power is not exhausted; or when the power overload capacity is greater than or equal to the reserved power, the processing unit 920 is configured to determine that the reserved power is exhausted. For details, refer to the detailed description of S230 in the embodiment shown in FIG. 2. Details are not described herein again.

Optionally, the preset threshold includes a first preset threshold and a second preset threshold, and the first preset threshold is greater than the second preset threshold. The power supply unit 910 is configured to power off the first PD when accumulated duration in which the power overload capacity is greater than or equal to zero and less than the actually used power of the first PD reaches the first preset threshold; or power off the first PD when accumulated duration in which the power overload capacity is greater than or equal to the actually used power of the first PD and less than the reserved power reaches the second preset threshold. For details, refer to the detailed description of S230 in the embodiment shown in FIG. 2. Details are not described herein again.

Optionally, the power supply unit 910 is further configured to power on the first PD again when remaining power is greater than the applied power of the first PD, where the remaining power is a difference of the actual available power minus total power actually used by the PSE after the first PD is powered off. For details, refer to the detailed description of S230 in the embodiment shown in FIG. 2. Details are not described herein again.

For example, the apparatus 900 may be corresponding to the PSE in the foregoing method embodiment, or a component configured in the PSE, for example, a chip or a chip system. In addition, units in the apparatus 900 may be configured to implement corresponding procedures performed by the PSE in the method shown in FIG. 5. For example, the processing unit 920 is configured to determine the power overload capacity, where the power overload capacity is a difference of total power actually used by the PSE when the PSE supplies power to the plurality of PDs minus the actual available power of the PSE. The total power is a sum of actual power used by a plurality of powered-on ports. The actual available power of the PSE is a difference of the entire available power of the PSE minus the reserved power. For details, refer to the detailed description of S510 in the embodiment shown in FIG. 5. Details are not described herein again. The processing unit 920 is further configured to determine, based on the power overload capacity and a plurality of intervals, whether to continue supplying power to the plurality of PDs. The processing unit 920 is configured to: if the power overload capacity falls into a first interval, continue supplying power to the plurality of PDs; or power off, if the power overload capacity falls into a second interval, one or more PDs of the plurality of PDs when accumulated duration in which the power overload capacity falls into the second interval reaches a preset threshold. For details, refer to the detailed description of S520 in the embodiment shown in FIG. 5. Details are not described herein again.

Optionally, the preset threshold includes a first preset threshold and a second preset threshold, the first preset threshold is greater than the second preset threshold, the first preset threshold corresponds to the trigger zone, and the second preset threshold corresponds to the dangerous zone. The power supply unit 910 is configured to power off the first PD connected to the first port when accumulated duration in which the power overload capacity falls into the trigger zone reaches the first preset threshold; or power off the first PD connected to the first port when accumulated duration in which the power overload capacity falls into the dangerous zone reaches the second preset threshold. The first port is the port with the lowest priority in the plurality of used ports of the PSE. For details, refer to the detailed description of S520 in the embodiment shown in FIG. 5. Details are not described herein again.

Optionally, the processing unit 920 is further configured to determine a count value C, where the count value C is a sum of a most recently updated count value and a count factor corresponding to an interval into which the power overload capacity falls, and a count factor corresponding to the first interval is less than a count factor corresponding to the second interval; and determine, based on the count value C and a predefined maximum power-off count $C_{max}$, whether to continue supplying power to the plurality of PDs. The power supply unit 910 is further configured to: if $C \leq C_{max}$, continue supplying power to the plurality of PDs; or if $C > C_{max}$, power off one or more PDs in the plurality of PDs. For details, refer to the detailed description in FIG. 3, and details are not described herein again.

Optionally, the processing unit 910 is further configured to set the count value to zero if the power overload capacity falls into a stable zone; or if the power overload capacity falls into a critical zone, determine that the count value is a sum of the most recently updated count value and a first count factor c; or if the power overload capacity falls into the trigger zone, determine that the count value is a sum of the most recently updated count value and a second count factor b; or if the power overload capacity falls into the dangerous zone, determine that the count value is a sum of the most recently updated count value and a third count factor a. For details, refer to the detailed description in FIG. 3, and details are not described herein again.

Optionally, the power supply unit 910 is further configured to: if the power overload capacity falls into a third interval, power off one or more PDs in the plurality of PDs, where the third interval is $[P_s, +\infty)$, and $P_s$ is the reserved power. For details, refer to the detailed description of S520 in the embodiment shown in FIG. 5. Details are not described herein again.

In addition, the units in the apparatus 900 shown in FIG. 9 may be further configured to implement corresponding procedures performed by the PSE in the method shown in FIG. 6. For example, the processing unit 920 may be configured to determine maximum allowable overload power of a PD connected to each of the plurality of ports. For details, refer to detailed descriptions of S610 in the embodiment shown in FIG. 6. Details are not described herein again. The processing unit 920 may be further configured to determine, based on a power usage status of a second PD, whether to power off the second PD. For details, refer to the detailed description of S620 in the embodiment shown in FIG. 6. Details are not described herein again.

It should be understood that, in embodiments of this disclosure, module division is an example, and is merely a logical function division. During actual implementation, another division manner may be used. In addition, functional modules in embodiments of this disclosure may be integrated into one processor, or may exist alone physically, or two or more modules may be integrated into one module. The integrated module may be implemented in a form of hardware, or may be implemented in a form of a software functional module.

FIG. 10 is another schematic block diagram of a power management apparatus 1000 for PSE according to an embodiment of this disclosure. The apparatus 1000 may be a chip system, or may be an apparatus configured with a chip system to implement a function of power management for PSE in the foregoing method embodiment. In this embodiment of this disclosure, the chip system may include a chip, or may include a chip and another discrete component.

As shown in FIG. 10, the apparatus 1000 may include a processor 1010 (e.g., one or more processors) and a communication interface 1020. The communication interface 1020 may be configured to communicate with another device by using a transmission medium, so that an apparatus in the apparatus 1000 can communicate with the other device. The communication interface 1020 may be, for example, a transceiver, an interface, a bus, a circuit, or an apparatus that can implement a transceiver function. The processor 1010 may input and output data by using the communication interface 1020, and is configured to implement the power management method for PSE in the embodiment corresponding to FIG. 2 or FIG. 5. Details are as follows. The apparatus 1000 may be configured to implement a function of the PSE in the foregoing method embodiment.

For example, if the apparatus 1000 is configured to implement the function of the PSE in the method provided in the embodiment of this disclosure, and is configured to implement the power management method for PSE in the embodiment corresponding to FIG. 2, the processor 1010 may be configured to supply power to a plurality of PDs. For details, refer to the detailed description of S210 in the embodiment shown in FIG. 2. Details are not described herein again. The processor 1010 may be further configured to determine reserved power of the PSE based on a power usage status, where the reserved power is used to continue supplying power to the plurality of PDs when actual available power of the PSE is exhausted, and the reserved power varies with the power usage status of the PSE. For details, refer to the detailed description of S220 in the embodiment shown in FIG. 2. Details are not described herein again.

Optionally, the processor 1010 may be further configured to determine the reserved power of the PSE based on applied power or used power of a first PD connected to a first port. For details, refer to the detailed description of S220 in the embodiment shown in FIG. 2. Details are not described herein again.

Optionally, the processor 1010 may be further configured to determine the applied power of the first PD connected to the first port or n times the applied power of the first PD as the reserved power of the PSE, where n is a constant greater than 1; or determine m times the actually used power of the first PD as the reserved power of the PSE, where m is a constant greater than 1. For details, refer to the detailed description of S220 in the embodiment shown in FIG. 2. Details are not described herein again.

Optionally, the processor 1010 may be further configured to determine the actual available power, where the actual available power is a difference of entire available power of the PSE minus the reserved power; and continue supplying power to the first PD when the actual available power is not exhausted; or power off the first PD when accumulated duration in which the actual available power is exhausted but the reserved power is not exhausted reaches a preset threshold; or power off the first PD when the reserved power is exhausted. For details, refer to the detailed description of S230 in the embodiment shown in FIG. 2. Details are not described herein again.

Optionally, the processor 1010 may be further configured to determine a power overload capacity, where the power overload capacity is a difference of total power actually used by the PSE minus the actual available power of the PSE; and when the power overload capacity is greater than or equal to zero and less than the reserved power, determine that the actual available power is exhausted but the reserved power is not exhausted; or when the power overload capacity is greater than or equal to the reserved power, determine that the reserved power is exhausted. For details, refer to the detailed description of S230 in the embodiment shown in FIG. 2. Details are not described herein again.

Optionally, the preset threshold includes a first preset threshold and a second preset threshold, and the first preset threshold is greater than the second preset threshold. The processor 1010 may be further configured to power off the first PD when accumulated duration in which the power overload capacity is greater than or equal to zero and less than the actually used power of the first PD reaches the first preset threshold; or power off the first PD when accumulated duration in which the power overload capacity is greater than or equal to the actually used power of the first PD and less than the reserved power reaches the second preset threshold. For details, refer to the detailed description of S230 in the embodiment shown in FIG. 2. Details are not described herein again.

Optionally, the processor 1010 may be further configured to power on the first PD again when remaining power is greater than the applied power of the first PD, where the remaining power is a difference of the actual available power minus total power actually used by the PSE after the first PD is powered off. For details, refer to the detailed description of S230 in the embodiment shown in FIG. 2. Details are not described herein again.

Optionally, the processor 1010 may be further configured to determine maximum allowable overload power of a PD connected to each of the plurality of powered-on ports. For details, refer to detailed descriptions of S610 in the embodiment shown in FIG. 6. Details are not described herein again. The processor 1010 may be further configured to power off a second PD connected to a second port when accumulated duration in which power used by the second PD is greater than applied power of the second PD but is less than or equal to the maximum allowable overload power of the second PD reaches a third preset threshold; or power off the second PD when the used power of the second PD is greater than the maximum allowable overload power. The second port is any one of the plurality of powered-on ports.

For details, refer to the detailed description of S620 in the embodiment shown in FIG. 6. Details are not described herein again.

For example, if the apparatus 1000 is configured to implement the function of the PSE in the method provided in the embodiment of this disclosure, and is configured to implement the power management method for PSE in the embodiment corresponding to FIG. 5, the processor 1010 may be configured to determine the power overload capacity. The power overload capacity is a difference of the total power actually used by the PSE when the PSE supplies power to the plurality of PDs minus the actual available power of the PSE, and the total power is a sum of actual power used by a plurality of powered-on ports. The actual available power of the PSE is a difference of the entire available power of the PSE minus the reserved power. For details, refer to the detailed description of S510 in the embodiment shown in FIG. 5. Details are not described herein again. The processor 1010 may be further configured to determine, based on the power overload capacity and a plurality of intervals, whether to continue supplying power to the plurality of PDs; and if the power overload capacity falls into a first interval, continue supplying power to the plurality of PDs; or power off, if the power overload capacity falls into a second interval, one or more PDs of the plurality of PDs when accumulated duration in which the power overload capacity falls into the second interval reaches a preset threshold. For details, refer to the detailed description of S520 in the embodiment shown in FIG. 5. Details are not described herein again.

Optionally, the preset threshold includes a first preset threshold and a second preset threshold, the first preset threshold is greater than the second preset threshold, the first preset threshold corresponds to the trigger zone, and the second preset threshold corresponds to the dangerous zone. The processor 1010 is configured to power off the first PD connected to the first port when accumulated duration in which the power overload capacity falls into the trigger zone reaches the first preset threshold; or power off the first PD connected to the first port when accumulated duration in which the power overload capacity falls into the dangerous zone reaches the second preset threshold. The first port is the port with the lowest priority in the plurality of used ports of the PSE. For details, refer to the detailed description of S520 in the embodiment shown in FIG. 5. Details are not described herein again.

Optionally, the processor 1010 is further configured to determine a count value C, where the count value C is a sum of a most recently updated count value and a count factor corresponding to an interval into which the power overload capacity falls, and a count factor corresponding to the first interval is less than a count factor corresponding to the second interval; and determine, based on the count value C and a predefined maximum power-off count $C_{max}$, whether to continue supplying power to the plurality of PDs. The power supply unit 910 is further configured to: if $C \leq C_{max}$, continue supplying power to the plurality of PDs; or if $C > C_{max}$, power off one or more PDs in the plurality of PDs. For details, refer to the detailed description in FIG. 3, and details are not described herein again.

Optionally, the processor 1010 is further configured to set the count value to zero if the power overload capacity falls into a stable zone; or if the power overload capacity falls into a critical zone, determine that the count value is a sum of the most recently updated count value and a first count factor c; or if the power overload capacity falls into the trigger zone, determine that the count value is a sum of the most recently updated count value and a second count factor b; or if the power overload capacity falls into the dangerous zone, determine that the count value is a sum of the most recently updated count value and a third count factor a. For details, refer to the detailed description in FIG. 3, and details are not described herein again.

Optionally, the processor 1010 is further configured to: if the power overload capacity falls into a third interval, power off one or more PDs in the plurality of PDs, where the third interval is [$P_s$, +∞), and $P_s$ is the reserved power. For details, refer to the detailed description of S520 in the embodiment shown in FIG. 5. Details are not described herein again.

It should be understood that a type of the processor is not limited in this embodiment of this disclosure. For example, the processor may be a neural-network process unit (NPU).

Optionally, the apparatus 1000 further includes at least one memory 1030, configured to store a program instruction and/or data. The memory 1030 is coupled to the processor 1010. The coupling in this embodiment of this disclosure may be an indirect coupling or a communication connection between apparatuses, units, or modules in an electrical form, a mechanical form, or another form, and is used for information exchange between the apparatuses, the units, or the modules. The processor 1010 may cooperate with the memory 1030. The processor 1010 may execute the program instruction stored in the memory 1030. At least one of the at least one memory may be included in the processor.

A specific connection medium between the processor 1010, the communication interface 1020, and the memory 1030 is not limited in this embodiment of this disclosure. In this embodiment of this disclosure, in FIG. 10, the processor 1010, the communication interface 1020, and the memory 1030 are connected through a bus 1040. The bus 1040 is represented by a thick line in FIG. 10, which is merely an example for description. A connection manner between other components is not limited thereto. The bus may be classified into an address bus, a data bus, a control bus, and the like. For ease of representation, only one thick line is used to represent the bus in FIG. 10, but this does not mean that there is only one bus or only one type of bus.

This disclosure further provides a computer program product, and the computer program product includes a computer program (which may also be referred to as code or an instruction). When the computer program is run, a computer is enabled to perform the method performed by the PSE in any one of the embodiments shown in FIG. 2 or FIG. 5.

This disclosure further provides a computer-readable storage medium. The computer-readable storage medium stores a computer program (which may also be referred to as code or an instruction). When the computer program is run, a computer is enabled to perform the method performed by the PSE in any one of the embodiments shown in FIG. 2 or FIG. 5.

It should be understood that the processor in this embodiment of this disclosure may be an integrated circuit chip, and has a signal processing capability. In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field-programmable gate array (FPGA) or another programmable logic device, a discrete gate or a transistor logic device, or a discrete hardware component. It may implement or perform the methods, the steps, and logical block diagrams that are disclosed in the embodiments of this disclosure. The general-purpose processor may be a microprocessor, or the processor may be any other processor, or the like. Steps of the methods disclosed with reference to the embodiments of this disclosure may be directly executed and accomplished through a hardware decoding processor, or may be executed and accomplished by using a combination of hardware and software modules in the decoding processor. A software module may be located in a mature storage medium in the art, such as a random-access memory (RAM), a flash memory, a read-only memory (ROM), a programmable read-only memory (PROM), an electrically erasable programmable read-only memory (EEPROM), a register, or the like. The storage medium is located in the memory, and a processor reads information in the memory and completes the steps in the foregoing methods in combination with hardware of the processor.

It may be understood that the memory in embodiments of this disclosure may be a volatile memory or a nonvolatile memory, or may include a volatile memory and a nonvolatile memory. The nonvolatile memory may be a ROM, a PROM, an erasable programmable read-only memory (EPROM), an EEPROM, or a flash memory. The volatile memory may be a RAM used as an external cache. Through example but not limitative description, many forms of RAMs may be used, for example, a static random-access memory (SRAM), a dynamic random-access memory (DRAM), a synchronous dynamic random-access memory (SDRAM), a double data rate (DDR) SDRAM, an enhanced SDRAM (ESDRAM), a synchronous link dynamic random-access memory (SL-DRAM), and a direct Rambus dynamic random-access memory (DR RAM). It should be noted that the memory of the systems and methods described in this specification includes but is not limited to these and any memory of another proper type.

Terms such as "unit" and "module" used in this specification may indicate a computer-related entity, hardware, firmware, a combination of hardware and software, software, or software being executed.

A person of ordinary skill in the art may be aware that, in combination with illustrative logical blocks (illustrative logical block) described in the embodiments disclosed in this specification and steps (step) may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this disclosure. In the several embodiments provided in this disclosure, it should be understood that the disclosed apparatus, device, and method may be implemented in other manners. For example, the described apparatus embodiments are merely examples. For example, division into the units is merely logical function division. There may be another division manner during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, and may be located at one location, or may be distributed on a plurality of network units. Some or all of the units may be selected based on actual requirements to achieve the objectives of the solutions of embodiments.

In addition, each functional unit in embodiments of this disclosure may be integrated into one processing unit, or each of the units may exist alone physically, or two or more units are integrated into one unit.

In the foregoing embodiments, all or some functions of the functional units may be implemented by using software, hardware, firmware, or any combination thereof. When software is used to implement the embodiments, all or a part of the embodiments may be implemented in a form of a computer program product. The computer program product includes one or more computer instructions (programs). When the computer program instructions (programs) are loaded and executed on the computer, the procedure or functions according to embodiments of this disclosure are all or partially generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

When the functions are implemented in the form of a software functional unit and sold or used as an independent product, the functions may be stored in a computer-readable storage medium. Based on such an understanding, the technical solutions of this disclosure essentially, or the part contributing to other technologies, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this disclosure. The foregoing storage medium includes: any medium that can store program code, such as a Universal Serial Bus (USB) flash drive, a removable hard disk, a ROM, a RAM, a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method, comprising:
    supplying, through a plurality of ports of a power sourcing equipment (PSE) and to a plurality of powered devices (PDs), power;
    setting, based on a power usage status, reserved power of the PSE, wherein the reserved power varies with the power usage status, wherein the power usage status comprises a power change frequency of the PSE, wherein the power change frequency indicates a change frequency of total power actually used by the PSE through the plurality of ports, and wherein setting the reserved power comprises:
    measuring a first power change rate of the total power actually used by the PSE through the plurality of ports, wherein the first power change rate is greater than or equal to a threshold;
    setting, in response to measuring the first power change rate, the reserved power of the PSE to a first power value;
    measuring a second power change rate of the total power actually used by the PSE through the plurality of ports, wherein the second power change rate is less than the threshold; and
    setting, in response to measuring the second power change rate, the reserved power of the PSE to a second power value, wherein the first power value is greater than the second power value;
    determining that actual available power of the PSE is exhausted; and
    continuing supplying, to the plurality of PDs and using the reserved power, the power based on the determining that the actual available power of the PSE is exhausted.

2. The method of claim 1, wherein the plurality of ports comprises used ports, wherein the used ports comprise a first port having a lowest priority of the used ports, and wherein setting the reserved power comprises setting, based on applied power or used power of a first one of the plurality of PDs connected to the first port, the reserved power.

3. The method of claim 2, wherein setting the reserved power comprises:
    setting the applied power or n times the applied power as the reserved power, wherein n is a first constant greater than 1; or
    setting m times the used power, wherein m is a second constant greater than 1.

4. The method of claim 1, wherein the actual available power is a difference of entire available power of the PSE and the reserved power, and wherein the change frequency of the total power actually used by the PSE through the plurality of ports is for two or more detection periodicities.

5. The method of claim 1, further comprising:
    continuing supplying, to a first one of the plurality of PDs, the power when the actual available power is not exhausted, wherein the actual available power is a first difference of entire available power of the PSE and the reserved power;
    powering off the first one of the plurality of PDs when a first accumulated duration in which the actual available power is exhausted but the reserved power is not exhausted reaches a preset first threshold; and
    powering off the first one of the plurality of PDs when the reserved power is exhausted.

6. The method of claim 5, further comprising calculating: a power overload capacity as a second difference of total power actually used by the PSE and the actual available power, wherein the actual available power is exhausted but the reserved power is not exhausted when the power overload capacity is greater than or equal to zero and less than the reserved power, and wherein the reserved power is exhausted when the power overload capacity is greater than or equal to the reserved power.

7. The method of claim 5, wherein the preset first threshold comprises a preset second threshold and a preset third threshold, wherein the preset second threshold is greater than the preset third threshold, and wherein powering off the first one of the plurality of PDs when the first accumulated duration reaches the preset first threshold comprises:
powering off the first one of the plurality of PDs when a second accumulated duration in which the power overload capacity is greater than or equal to zero and less than actually used power reaches the preset second threshold; and
powering off, the first one of the plurality of PDs when a third accumulated duration in which the power overload capacity is greater than or equal to the actually used power and less than the reserved power reaches the preset third threshold.

8. The method of claim 7, further comprising powering on the first one of the plurality of PDs again when remaining power is greater than applied power of the first one of the plurality of PDs, wherein the remaining power is a second difference of the actual available power and total power actually used by the PSE after the first one of the plurality of PDs is powered off.

9. The method of claim 1, further comprising:
calculating maximum allowable overload power of each of the plurality of PDs connected to one of a plurality of powered-on ports of the PSE;
powering off a first one of the plurality of PDs connected to a first one of the plurality of powered-on ports when a first accumulated duration in which power used by the first one of the plurality of PDs is greater than applied power of the first one of the plurality of PDs but is less than or equal to the maximum allowable overload power reaches a preset first threshold; and
powering off the first one of the plurality of PDs when the power is greater than the maximum allowable overload power.

10. The method of claim 1, wherein setting the reserved power of the PSE further comprises setting the reserved power of the PSE based on a power change amplitude of the PSE.

11. A method, comprising:
calculating a first power overload capacity as a first difference of first total power actually used by a power sourcing equipment (PSE) to supply first power to a plurality of powered devices (PDs) and first actual available power of the PSE, wherein the first total power is a first sum of first actual power used by a plurality of powered-on ports, and wherein the first actual available power is a second difference of entire available power of the PSE and reserved power;
continuing supplying, to the plurality of PDs, the first power during a first interval, power, wherein the first interval includes a range where the first power overload capacity is less than 0;
calculating a second power overload capacity as a third difference of second total power actually used by the PSE to supply second power to the plurality of PDs and second actual available power of the PSE, wherein the second total power is a second sum of second actual power used by the plurality of powered-on ports, and wherein the second actual available power is a fourth difference of the entire available power of the PSE and the reserved power;
determining that a first accumulated duration in which the second power overload capacity falls into a second interval reaches a preset threshold; and
powering off one or more of the plurality of PDs based on the determining that the first accumulated duration in which the second power overload capacity falls into the second interval reaches the preset threshold, wherein the second interval is $[0, P_s)$, and wherein $P_s$ is the reserved power.

12. The method of claim 11, wherein the second interval comprises a trigger zone and a dangerous zone, wherein the trigger zone is $[0, P_r)$, wherein the dangerous zone is $[P_r, P_s)$, wherein $P_r$ is actually used power of a first PD connected to a first port of the PSE, and wherein the first port has a lowest priority in a plurality of used ports of the PSE.

13. The method of claim 12, wherein the preset first threshold comprises a preset second threshold and a preset third threshold, wherein the preset second threshold is greater than the preset third threshold, wherein the preset second threshold corresponds to the trigger zone, wherein the preset third threshold corresponds to the dangerous zone, and wherein powering off the one or more PDs of the plurality of PDs comprises:
powering off the first PD when a second accumulated duration in which the power overload capacity falls into the trigger zone reaches the preset second threshold; and
powering off the first PD when a third accumulated duration in which the power overload capacity falls into the dangerous zone reaches the preset third threshold.

14. The method of claim 12, further comprising:
calculating a count value (C), wherein the C is a first sum of a most recently updated count value and a first count factor corresponding to a third interval into which the power overload capacity falls, and wherein a second count factor corresponding to the first interval is less than a third count factor corresponding to the second interval;
continuing supplying the power when the $C \leq C_{max}$, wherein $C_{max}$ is a predefined maximum power-off count; and
powering off one or more PDs in the plurality of PDs when the $C > C_{max}$.

15. The method of claim 14, wherein the first interval comprises a stable zone and a critical zone, wherein the stable zone is less than $-|P_s - P_r|$, wherein the critical zone is $[-|P_s - P_r|, 0)$ and corresponds to a fourth count factor (c), wherein c is a negative number, and wherein the method further comprises:
setting the C to zero when the power overload capacity falls into the stable zone; and
calculating the C as a second sum of the most recently updated count value and the c when the power overload capacity falls into the critical zone.

16. The method of claim 14, wherein the trigger zone corresponds to a fourth count factor (b), wherein the dangerous zone corresponds to a fifth count factor (a), wherein a>b, wherein a and b are positive numbers, and wherein the method further comprises:
calculating the C as a second sum of the most recently updated count value and the b when the power overload capacity falls into the trigger zone; and calculating the C as a third sum of the most recently updated count value and the a when the power overload capacity falls into the dangerous zone.

17. The method of claim 11, further comprising powering off one or more of the plurality of PDs when the power overload capacity falls into a third interval, wherein the third interval includes a range where the power overload capacity is greater than $P_s$, and wherein $P_s$ is the reserved power.

18. The method of claim 11, further comprising powering on a first one of the plurality of PDs again when remaining power is greater than applied power of the first one of the plurality of PDs, wherein the remaining power is a difference of the actual available power and total power used by ports of the PSE after the first one of the plurality of PDs is powered off, wherein the first one of the plurality of PDs is connected to a first one of the ports, and wherein the first one of the ports has a lowest priority in the ports.

19. The method of claim 11, further comprising:
calculating maximum allowable overload power of each of the plurality of PDs connected to one of the plurality of powered-on ports of the PSE;
powering off a first one of the plurality of PDs connected to a first one of the plurality of powered-on ports when a second accumulated duration in which power used by the first one of the plurality of PDs is greater than applied power of the first one of the plurality of PDs but is less than or equal to the maximum allowable overload power reaches a preset second threshold; and
powering off the first one of the plurality of PDs when the power is greater than the maximum allowable overload power.

20. An apparatus, comprising:
a memory configured to store instructions; and
one or more processors coupled to the memory and configured to execute the instructions to:
supply, through a plurality of ports of a power sourcing equipment (PSE) and to a plurality of powered devices (PDs), power;
set, based on a power usage status, reserved power of the PSE, wherein the reserved power varies with the power usage status, wherein the power usage status comprises a power change frequency of the PSE, wherein the power change frequency indicates a change frequency of total power actually used by the PSE through the plurality of ports, and wherein setting the reserved power comprises:
measuring a first power change rate of the total power actually used by the PSE through the plurality of ports, wherein the first power change rate is greater than or equal to a preset first threshold;
setting, in response to measuring the first power change rate, the reserved power of the PSE to a first power value;
measuring a second power change rate of the total power actually used by the PSE through the plurality of ports, wherein the second power change rate is less than the preset first threshold; and
setting, in response to measuring the second power change rate, the reserved power of the PSE to a second power value, wherein the first power value is greater than the second power value; and
continue to supply, to the plurality of PDs and using the reserved power, the power when actual available power of the PSE is exhausted.

* * * * *